United States Patent
Li et al.

(10) Patent No.: US 10,939,392 B2
(45) Date of Patent: Mar. 2, 2021

(54) METHOD AND APPARATUS FOR DERIVING DOWNLINK PATHLOSS FOR DEVICE-TO-DEVICE TRANSMIT POWER CONTROL IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/932,278

(22) Filed: Jul. 17, 2020

(65) Prior Publication Data

US 2021/0022091 A1   Jan. 21, 2021

Related U.S. Application Data

(60) Provisional application No. 62/876,367, filed on Jul. 19, 2019.

(51) Int. Cl.
*H04W 88/04* (2009.01)
*H04W 52/38* (2009.01)
*H04W 52/24* (2009.01)

(52) U.S. Cl.
CPC ....... *H04W 52/383* (2013.01); *H04W 52/242* (2013.01)

(58) Field of Classification Search
CPC ..... H04W 4/40; H04W 92/18; H04W 56/001; H04W 72/0413; H04W 16/28; H04W 8/005; H04W 4/46; H04W 88/04; H04W 52/08; H04W 52/367; H04W 72/1284; H04W 52/54

See application file for complete search history.

(56) References Cited

U.S. PATENT DOCUMENTS

| | | | |
|---|---|---|---|
| 2017/0127405 A1 | 5/2017 | Agiwal | |
| 2018/0049137 A1 | 2/2018 | Li | |
| 2019/0089451 A1* | 3/2019 | Seo | H04W 88/04 |
| 2019/0357262 A1* | 11/2019 | Cirik | H04W 76/11 |
| 2020/0053743 A1 | 2/2020 | Cheng | |

* cited by examiner

*Primary Examiner* — Tu X Nguyen
(74) *Attorney, Agent, or Firm* — Skaar Ulbrich Macari, P.A.

(57) ABSTRACT

A method and apparatus are disclosed from the perspective of a device to perform sidelink transmission. The method includes the device being in RRC (Radio Resource Control)-connected mode in Uu link. The method also includes the device being configured to use at least DL (Downlink) pathloss for sidelink power control. The method further includes the device deriving a first DL pathloss value for determining an uplink transmit power of one specific kind of uplink transmission. In addition, the method includes the device determining or deriving a sidelink transmit power based on the first DL pathloss value. Furthermore, the method includes the device performing a sidelink transmission to other device(s) with the sidelink transmit power.

13 Claims, 19 Drawing Sheets

(a) Digital beamforming (b) Analogue beamforming

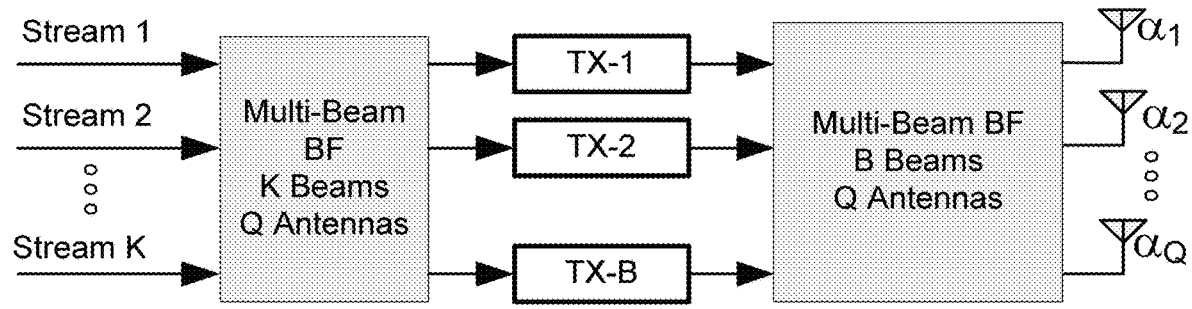
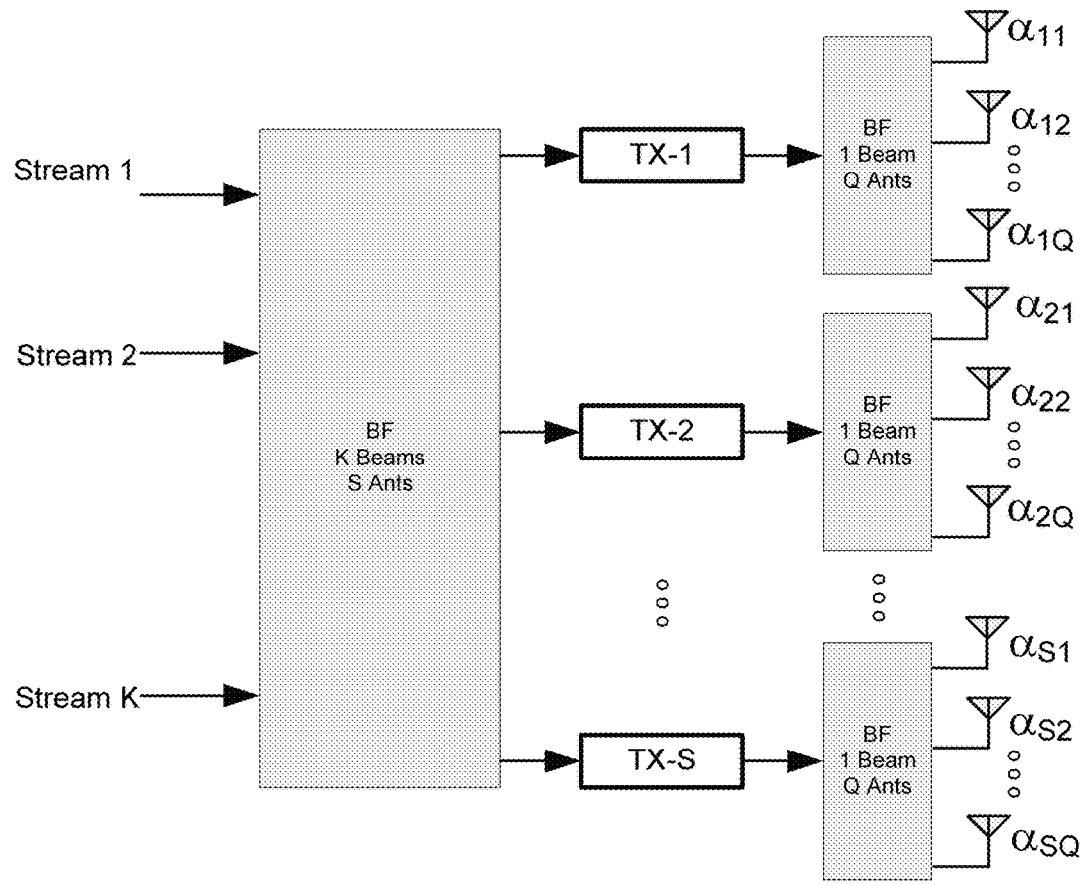
(c) Hybrid beamforming: Left = fully connected, Right = sub-array
FIG. 5C

| DCI format | Search Space |
|---|---|
| DCI format 5A | For PDCCH: Common and UE specific by C-RNTI |
| | For EPDCCH: UE specific by C-RNTI |

FIG. 7 (PRIOR ART)

| RS resource index $q_d$ | PUSCH | PUCCH | SRS | PRACH |
|---|---|---|---|---|
| | a SS/PBCH block that the UE uses to obtain MIB | a SSS/PBCH block that the UE uses to obtain MIB | a SSS/PBCH block that the UE uses to obtain MIB | |
| | | | | DL RS (such as SS/PBCH block) associated with the PRACH |
| | (Msg3) $q_d$ as for a corresponding PRACH | | | |
| | $q_d$ mapped to SRI field | | | |
| | $q_d$ as for a PUCCH | | | |
| | $q_d$ being equal to zero | $q_d$ being equal to zero | | |
| | Configured a $q_d$ | | Configured a $q_d$ | |
| | | MAC activation command indicating a value $q_d$ | | |

FIG. 8

| Alternatives for DL pathloss derivation (used for sidelink power control) | Mode 1 | Mode 2 (connected) | Mode 2 (Idle-mode) | Mixed Mode |
|---|---|---|---|---|
| a SS/PBCH block that the UE uses to obtain MIB | | V | V | |
| DL RS as for a corresponding PRACH (Msg3) | | | | |
| DL RS mapped to SRI field | V | | | V |
| DL RS as for a PUCCH | V | V | | V |
| DL RS index being equal to zero | V | V | | V |
| Configured a DL RS | V | V | | V |
| MAC activation command indicating a DL RS | V | V | | V |
| DL RS for corresponding received PDCCH (in method A) | V | | | V |
| DL RS that the UE uses to SL SIB (in method A) | V | V | V | V |
| Follow last pathloss used for UL power (in method B) | V | V | | V |
| specific PL value from multiple DL RSs (in method C) | V | V | V | V |
| specific PL value from multiple SSBs (in method D) | V | V | V | V |

FIG. 15

METHOD AND APPARATUS FOR DERIVING DOWNLINK PATHLOSS FOR DEVICE-TO-DEVICE TRANSMIT POWER CONTROL IN A WIRELESS COMMUNICATION SYSTEM

CROSS-REFERENCE TO RELATED APPLICATIONS

The present Application claims the benefit of U.S. Provisional Patent Application Ser. No. 62/876,367 filed on Jul. 19, 2019, the entire disclosure of which is incorporated herein in their entirety by reference.

FIELD

This disclosure generally relates to wireless communication networks, and more particularly, to a method and apparatus for deriving downlink pathloss for device-to-device transmit power control in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a device to perform sidelink transmission. The method includes the device being in RRC (Radio Resource Control)-connected mode in Uu link. The method also includes the device being configured to use at least DL (Downlink) pathloss for sidelink power control. The method further includes the device deriving a first DL pathloss value for determining an uplink transmit power of one specific kind of uplink transmission. In addition, the method includes the device determining or deriving a sidelink transmit power based on the first DL pathloss value. Furthermore, the method includes the device performing a sidelink transmission to other device(s) with the sidelink transmit power.

BRIEF DESCRIPTION OF THE DRAWINGS

FIGS. 5A-5C provide exemplary illustrations of three types of beamforming.

FIG. 7 is a reproduction of Table 14.2-2 of 3GPP TS 36.213 V15.6.0.

FIG. 8 is a table summarizing alternatives applied for NR uplink transmissions according to one exemplary embodiment.

FIG. 15 is a table summarizing alternatives for deriving DL pathloss value for determining or deriving sidelink transmit power according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; TS 36.213 V15.6.0 (2019-06), "E-UTRA; Physical layer procedures (Release 15)"; TS 36.214 V15.3.0 (2018-09), "E-UTRA; Physical layer; Measurements (Release 15)"; R1-1810051, "Final Report of 3GPP TSG RAN WG1 #94 v1.0.0 (Gothenburg, Sweden, 20-24 Aug. 2018)"; R1-1812101, "Final Report of 3GPP TSG RAN WG1 #94bis v1.0.0 (Chengdu, China, 8-12 Oct. 2018)"; R1-1901482, "Final Report of 3GPP TSG RAN WG1 #95 v0.1.0 (Spokane, USA, 12-16 Nov. 2018)"; R1-1901483, "Final Report of 3GPP TSG RAN WG1 #AH_1901 v1.0.0 (Taipei, Taiwan, 21-25 Jan. 2019)"; R1-1905837, "Final Report of 3GPP TSG RAN WG1 #96 v2.0.0 (Athens, Greece, 25 Feb.-1 Mar. 2019)"; R1-1905921, "Final Report of 3GPP TSG RAN WG1 #96bis v1.0.0 (Xi'an, China, 8-12 Apr. 2019)"; Draft Report of 3GPP TSG RAN WG1 #97 v0.1.0 (Reno, USA, 13-17 May 2019); and R1-1907682, "Feature lead summary for agenda item 7.2.4.5 Physical layer procedures for sidelink", LG Electronics. The standards and documents listed above are hereby expressly incorporated by reference in their entirety.

Figure 1:
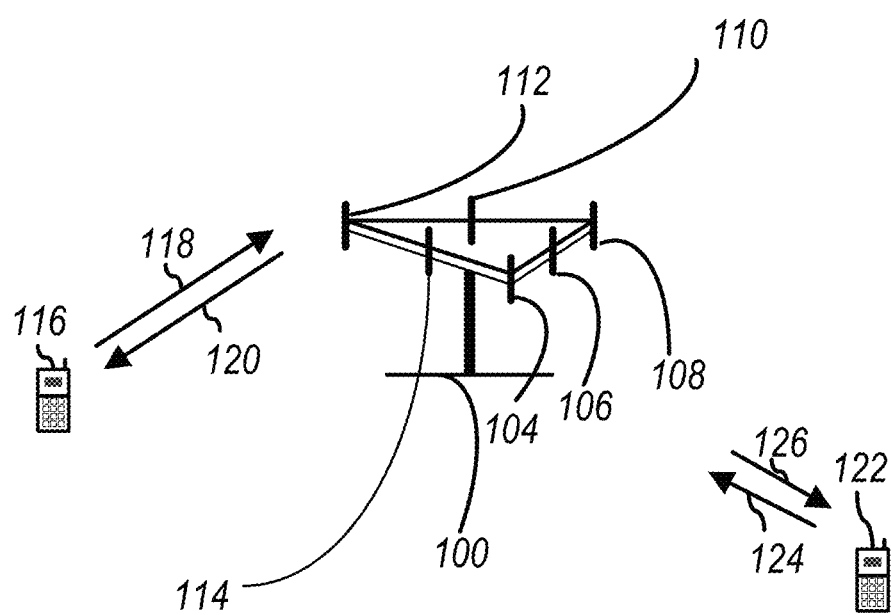
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
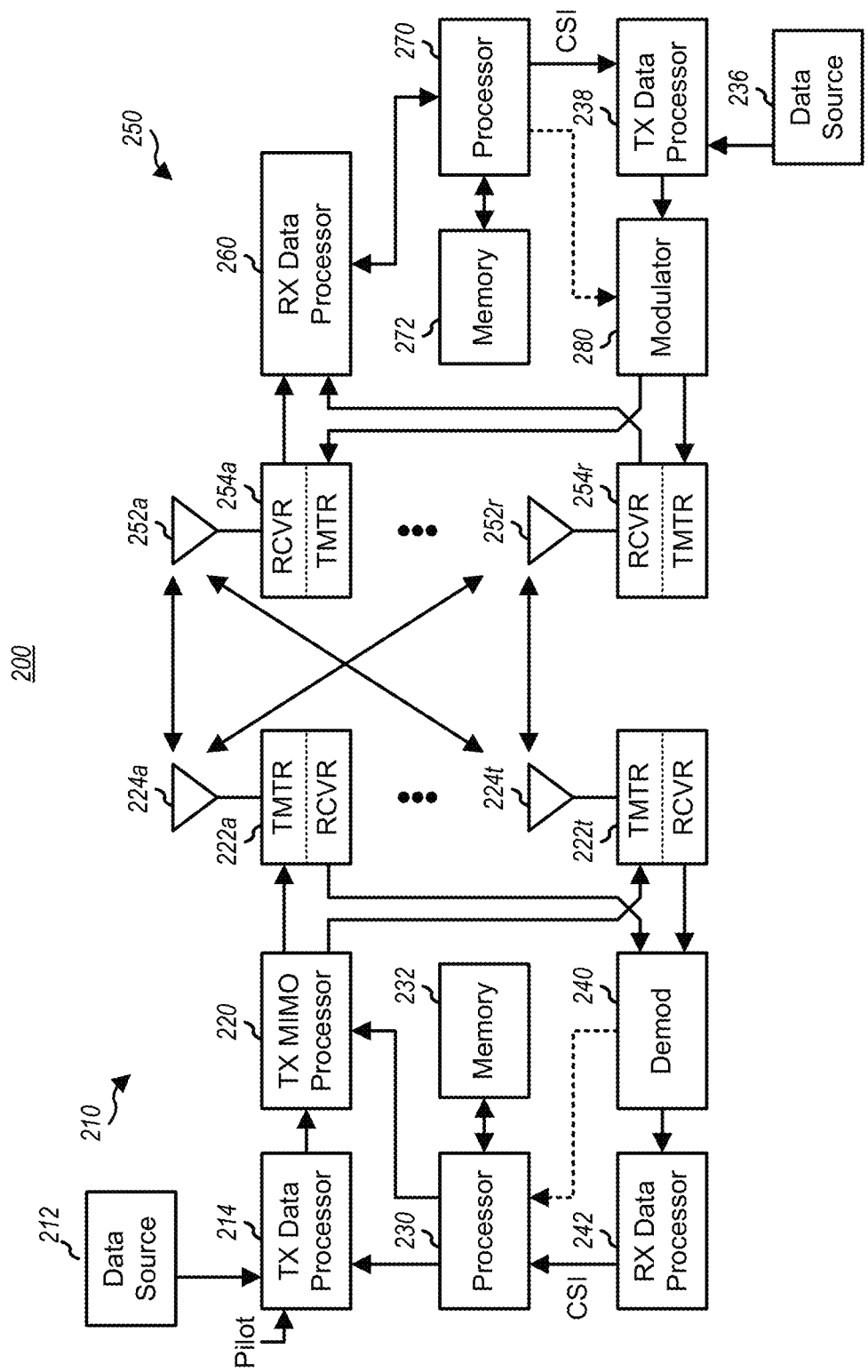
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
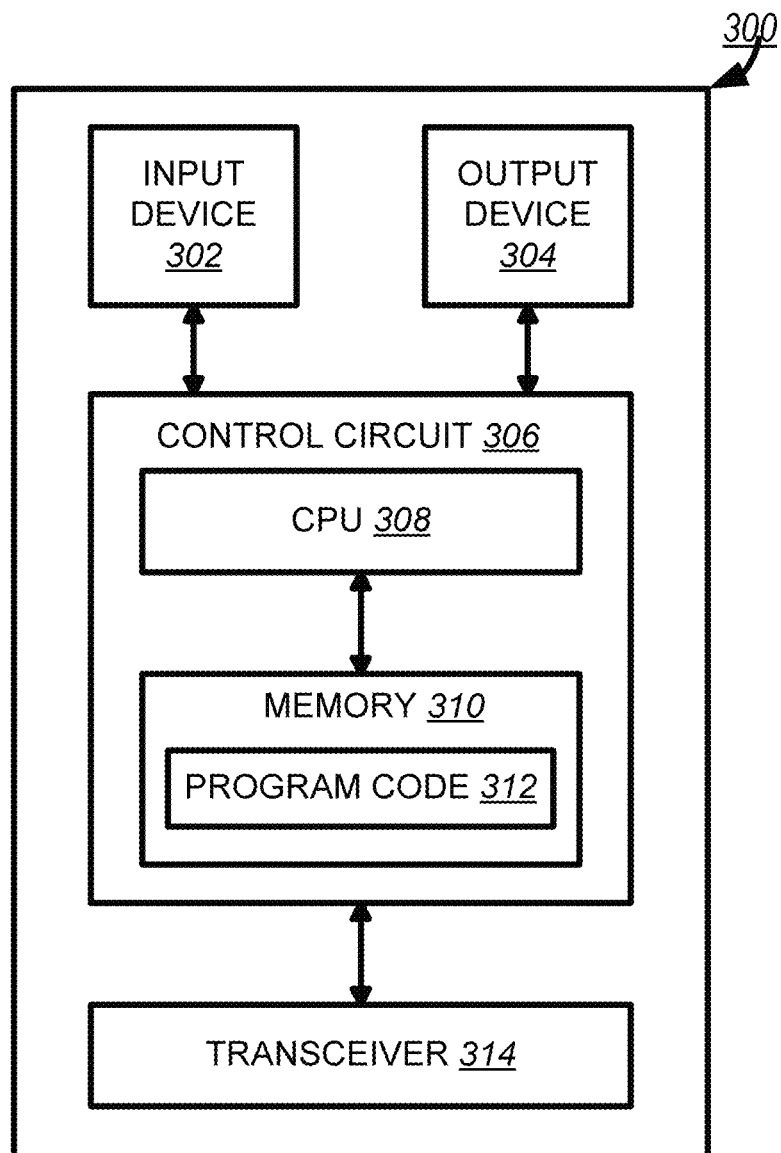
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
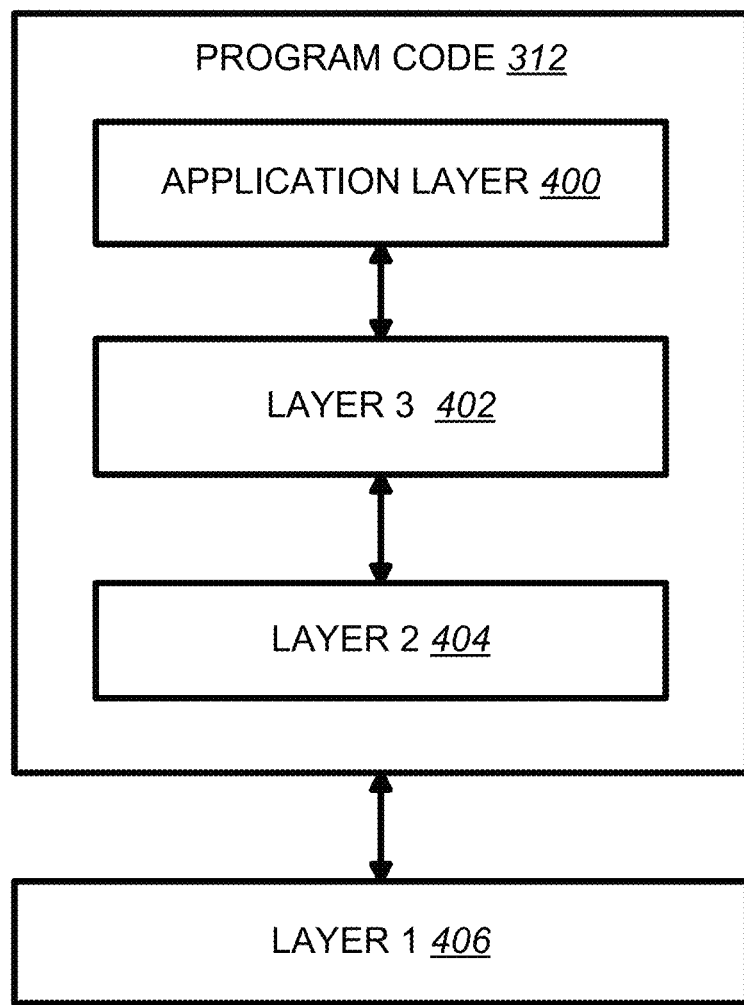
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g. current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Figure 5A:
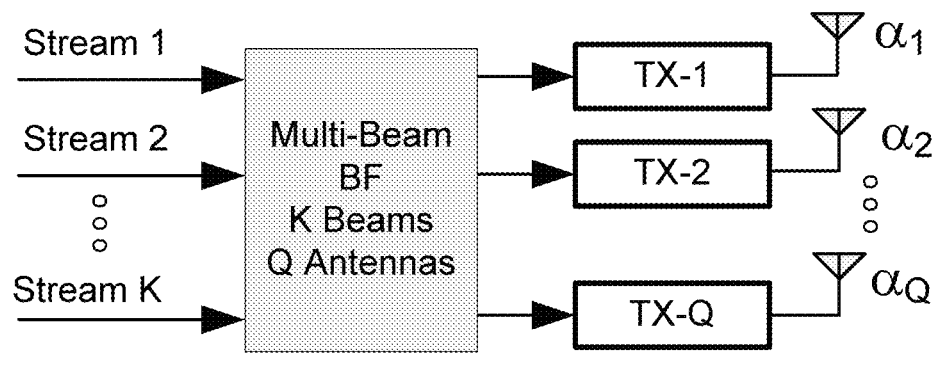
Figure 5B:
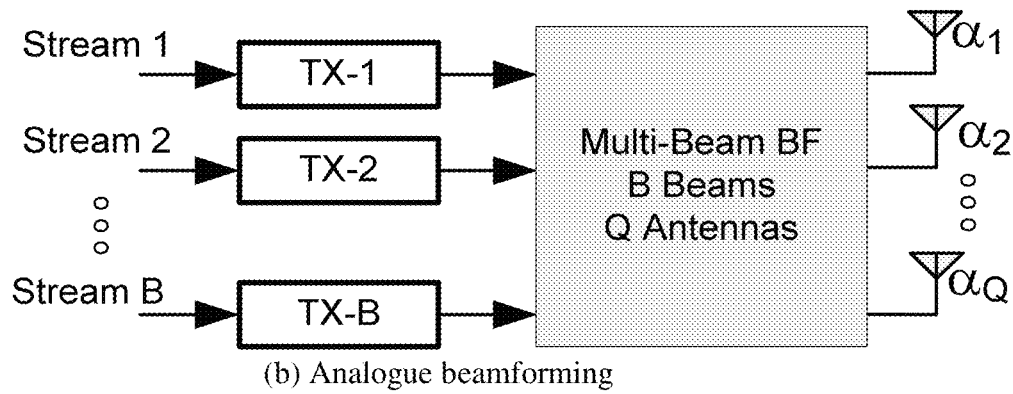

As described in 3GPP R2-163716, beamforming (for example, FIGS. 5A-5C illustrate three types of beamforming) is a signal processing technique used in antenna arrays for directional signal transmission or reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 6:
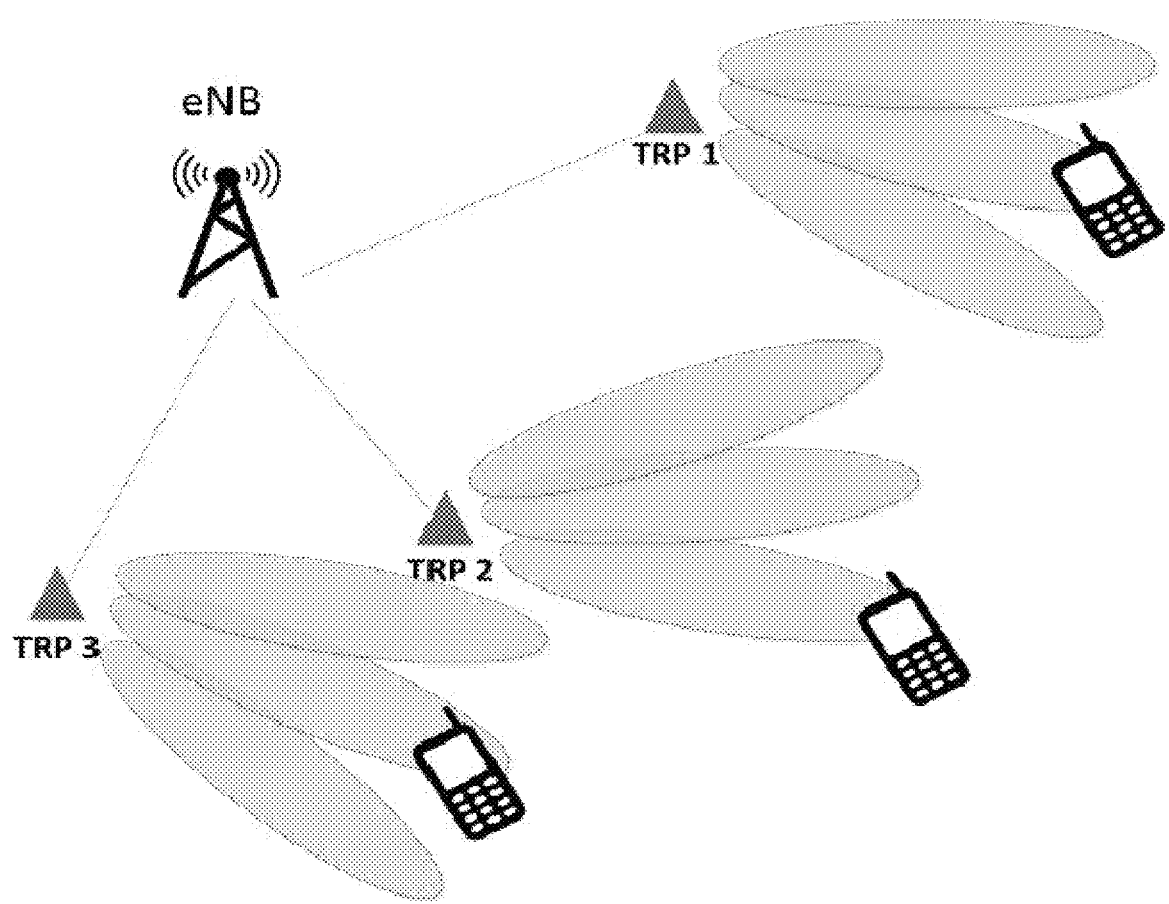
FIG. 6 is a reproduction of FIG. 1 of 3GPP R2-162709.

As discussed in 3GPP R2-162709 and as shown in FIG. 6 (which illustrates beam concept in 5G), an eNB may have multiple TRPs (either centralized or distributed). Each TRP can form multiple beams. The number of beams and the number of simultaneous beams in the time or frequency domain depend on the number of antenna array elements and the RF (Radio Frequency) at the TRP.

Potential mobility type for NR (New Radio) can be listed:
Intra-TRP mobility
Inter-TRP mobility
Inter-NR eNB mobility In 3GPP R2-162762, reliability of a system purely relying on beamforming and operating in higher frequencies might be challenging, since the coverage might be more sensitive to both time and space variations. As a consequence of that the SINR (Signal to Interference and Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

3GPP TS 36.213 specifies the UE procedure for LTE V2X transmission. The V2X transmissions are performed as sidelink transmission mode 3 or sidelink transmission mode 4.

5.1.1.1 UE Behaviour
[ . . . ]
$PL_c$ is the downlink path loss estimate calculated in the UE for serving cell c in dB and $PL_c$=reference- SignalPower–higher layer filtered RSRP, where referenceSignalPower is provided by higher layers and RSRP is defined in [5] for the reference serving cell and the higher layer filter configuration is defined in [11] for the reference serving cell.

If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

[ . . . ]
14 UE Procedures Related to Sidelink
[ . . . ]
14.1 Physical Sidelink Shared Channel Related Procedures
14.1.1 UE Procedure for Transmitting the PSSCH
[ . . . ]
14.1.1.5 UE Procedure for PSSCH Power Control
[ . . . ]
For sidelink transmission mode 3, the UE transmit power $P_{PSSCH}$ for PSSCH transmission is given by $$P_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}[dBm],$$

where $P_{CMAX}$ is defined in [6], and $M_{PSSCH}$ is the bandwidth of the PSSCH resource assignment expressed in number of resource blocks and $PL=PL_c$ where $PL_c$ is defined in Subclause 5.1.1.1. $P_{O\_PSSCH,3}$ and $\alpha_{PSSCH,3}$ are provided by higher layer parameters pOSL-V2V and alphaSL-V2V, respectively and that are associated with the corresponding PSSCH resource configuration. For sidelink transmission mode 4, the UE transmit power $P_{PSSCH}$ for PSSCH transmission in subframe n is given by $$P_{PSSCH} = 10\log_{10}\left(\frac{M_{PSSCH}}{M_{PSSCH} + 10^{\frac{3}{10}} \times M_{PSCCH}}\right) + A[dBm],$$

where $P_{CMAX}$ is defined in [6], $M_{PSSCH}$ is the bandwidth of the PSSCH resource assignment expressed in number of resource blocks, $M_{PSCCH}=2$, and $PL=PL_c$ where $PL_c$ is defined in Subclause 5.1.1.1. $P_{O\_PSSCH,4}$ and $\alpha_{PSSCH,4}$ are provided by higher layer parameters pOSL-V2V and alphaSL-V2V, respectively and that are associated with the corresponding PSSCH resource configuration. If higher layer parameter maxTxpower is configured then $$A = \min\left\{P_{CMAX}, P_{MAX\_CBR}, 10\log_{10}\left(M_{PSSCH} + 10^{\frac{3}{10}} \times M_{PSCCH}\right) + P_{O\_PSSCH,4} + \alpha_{PSSCH,4} \cdot PL\right\}$$

else $$A = \min\left\{P_{CMAX}, 10\log_{10}\left(M_{PSSCH} + 10^{\frac{3}{10}} \times M_{PSCCH}\right) + P_{O\_PSSCH,4} + \alpha_{PSSCH,4} \cdot PL\right\}$$

where $P_{MAX\_CBR}$ is set to a maxTxpower value based on the priority level of the PSSCH and the CBR range which includes the CBR measured in subframe n−4.

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}=10*SL\_RESOURCE\_RESELECTION\_COUNTER$, where $SL\_RESOURCE\_RESELECTION\_COUNTER$ is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where $j=0,\ldots,L_{subCH}-1$. The UE shall assume that any set of $L_{subCH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2\,min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where $i=a*8+b+1$.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j \times P'_{rsvp\_TX}=z+P_{step} \times k \times q$ where $j=0, 1, \ldots, C_{resel}-1$, $P'_{rsvp\_TX}=P_{step} \times P_{RSVP\_TX}/100$, k is any value allowed by the higher layer parameter restrictResourceReservationPeriod and $q=1,2,\ldots,Q$. Here, $Q=1/k$ if $k<1$ and $n'-z \leq P_{step} \times k$, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and $Q=1$ otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX}, prio_{RX}}$
   the SCI format received in subframe $t_m^{SL}$ or the same SCI format 1 which is assumed to be received in subframe(s) $t_{m-q \times P_{step} \times P_{rsvp\_RX}}^{SL}$ determines according to 14.1.1.4C the set of resource blocks and subframes which overlaps with $R_{x,y+j \times P'_{rsvp\_TX}}$ for $q=1, 2, \ldots, Q$ and $j=0, 1, \ldots, C_{resel}-1$. Here, $$Q = \frac{1}{P_{rsvp\_RX}} \text{ if } P_{rsvp\_RX} < 1 \text{ and } n'-m \leq P_{step} \times P_{rsvp\_RX},$$

where $t_n'^{SL}=n$ if subframe n belongs to the set $(t_0^{SL}, t_1^{SL}, \ldots, t_{T_{max}}^{SL})$, otherwise subframe $t_n'^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.
8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}*j}^{SL}$ for a non-negative integer j otherwise.
9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.
[ ... ]

14.2 Physical Sidelink Control Channel Related Procedures

For sidelink transmission mode 3, if a UE is configured by higher layers to receive DCI with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.
[Table 14.2-2 of 3GPP TS 36.213 V15.6.0, entitled "PDCCH/EPDCCH configured by SL-V-RNTI or SL-SPS-V-RNTI" is reproduced as FIG. 7]

The carrier indicator field value in DCI format 5A corresponds to v2x-InterFreqInfo.

14.2.1 UE Procedure for Transmitting the PSCCH
[ ... ]
14.2.1.3 UE Procedure for PSCCH Power Control
[ ... ] For sidelink transmission mode 3, the UE transmit power $P_{PSCCH}$ for PSCCH transmission is given by $$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\{P_{CMAX}, 10\log_{10}(M_{PSSCH} + 10^{\frac{3}{10}} \times M_{PSCCH}) + P_{O\_PSSCH,3} + \alpha_{PSSCH,3} \cdot PL\}[\text{dBm}],$$

where $P_{CMA}$ is defined in [6], $M_{PSSCI}$ is the bandwidth of the PSSCH resource assignment expressed in number of resource block, $M_{PSCCH}=2$ and PL=$PL_c$ where $PL_c$ is defined in Subclause 5.1.1.1. $P_{O\_PSSCH}$ and $\alpha_{PSSCH,3}$ are provided by higher layer parameters pOSL-V2V and alphaSL-V2V, respectively and that are associated with the corresponding PSSCH resource configuration.

For sidelink transmission mode 4, the UE transmit power $P_{PSCCH}$ for PSCCH transmission in subframe n is given by $$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B[\text{dBm}],$$

where $P_{CMA}$ is defined in [6], $M_{PSSCI}$ is the bandwidth of the PSSCH resource assignment expressed in number of resource block, $M_{PSCCH}=2$, and PL=$PL_c$ where $PL_c$ is defined in Subclause 5.1.1.1. $P_{O\_PSSCH}$, and $\alpha_{PSSCH,4}$ are provided by higher layer parameters pOSL-V2V and alphaSL-V2V, respectively and that are associated with the corresponding PSSCH resource configuration. If higher layer parameter maxTxpower is configured then $$B = \min\{P_{CMAX}, P_{MAX\_CBR},$$
$$10\log_{10}(M_{PSSCH} + 10^{\frac{3}{10}} \times M_{PSCCH}) + P_{O\_PSSCH,4} + \alpha_{PSSCH,4} \cdot PL\}$$

else $$B = \min\{P_{CMAX},$$
$$10\log_{10}(M_{PSSCH} + 10^{\frac{3}{10}} \times M_{PSCCH}) + P_{O\_PSSCH,4} + \alpha_{PSSCH,4} \cdot PL\}$$

where $P_{MAX\_CBR}$ is set to a maxTxpower value based on the priority level of the PSSCH and the CBR range which includes the CBR measured in subframe n−4.

3GPP TS 36.214 specifies some measurements for sidelink transmission.

| 5.1.28 Sidelink Received Signal Strength Indicator (S-RSSI) | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe The reference point for the S-RSSI shall be the antenna connector of the UE. If receiver diversity is in use by the UE, the reported value shall not be lower than the corresponding S-RSSI of any of the individual diversity branches |
| Applicable for | RRC_IDLE intra-frequency, RRC_IDLE inter-frequency, RRC_CONNECTED intra-frequency, RRC_CONNECTED inter-frequency |

| 5.1.29 PSSCH Reference Signal Received Power (PSSCH-RSRP) | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. |

| | 5.1.29 PSSCH Reference Signal Received Power (PSSCH-RSRP) |
|---|---|
| Applicable for | If receiver diversity is in use by the UE, the reported value shall not be lower than the corresponding PSSCH-RSRP of any of the individual diversity branches<br>RRC_IDLE intra-frequency,<br>RRC_IDLE inter-frequency,<br>RRC_CONNECTED intra-frequency,<br>RRC_CONNECTED inter-frequency |

NOTE:
The power per resource element is determined from the energy received during the useful part of the symbol, excluding the CP.

3GPP TS 36.212 specifies CRC attachment for downlink shared channel and downlink control information. The downlink shared channel and downlink control information are for communication between network node and UE, i.e. Uu link.

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

FIG. 5.3.3-1 shows the processing structure for one DCI. The following coding steps can be identified:

Information element multiplexing

CRC attachment

Channel coding

Rate matching

The coding steps for DCI are shown in the figure below.

[ . . . ]

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2(N_{subchannel}^{SL}) \rceil$ bits as defined in subclause 14.1.1.4C of [3].

SCI format 1 fields according to 5.4.3.1.2:

Frequency resource location of initial transmission and retransmission.

Time gap between initial transmission and retransmission.

SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

SL SPS configuration index—3 bits as defined in subclause 14.2.1 of [3].

Activation/release indication—1 bit as defined in subclause 14.2.1 of [3].

3GPP TS 36.212 also specifies CRC attachment for sidelink shared channel and sidelink control information. The sidelink shared channel and sidelink control information are for communication between devices, i.e. PC5 link or device-to-device link.

5.4 Sidelink Transport Channels and Control Information

[ . . . ]

5.4.2 Sidelink Shared Channel

The processing of the sidelink shared channel follows the downlink shared channel according to subclause 5.3.2, with the following differences:

Data arrives to the coding unit in the form of a maximum of one transport block every transmission time interval (TTI)

In the step of code block concatenation, the sequence of coded bits corresponding to one transport block after code block concatenation is referred to as one codeword in subclause 9.3.1 of [2].

PUSCH interleaving is applied according to subclauses 5.2.2.7 and 5.2.2.8 without any control information in order to apply a time-first rather than frequency-first mapping, where $c_{max}=2 \, (N_{symb}^{SL}-1)$. For SL-SCH configured by higher layers for V2X sidelink, $C_{max}=2 \cdot (N_{symb}^{SL}-2)-1$ is used if the transmission format field of SCI format 1 is present and set to 1, otherwise $C_{max}=2 \cdot (N_{symb}^{SL}-2)$.

5.4.3 Sidelink Control Information

An SCI transports sidelink scheduling information.

The processing for one SCI follows the downlink control information according to subclause 5.3.3, with the following differences:

In the step of CRC attachment, no scrambling is performed.

PUSCH interleaving is applied according to subclauses 5.2.2.7 and 5.2.2.8 without any control information in order to apply a time-first rather than frequency-first mapping, where $C_{max}=2 \cdot (N_{symb}^{SL}-1)$ and the sequence of bits f is equal to e. For SCI format 1, $C_{max}=2 \cdot (N_{symb}^{SL}-2)$ 5.4.3.1 SCI Formats The fields defined in the SCI formats below are mapped to the information bits $\alpha_0$ to $\alpha_{A-1}$ as follows.

[ . . . ]

5.4.3.1.2 SCI Format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—$\lceil \log_2 (N_{subchannel}^{SL} (N_{subchannel}^{SL}+1)/2) \rceil$ bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index—1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 38.213 specifies uplink power control for setting PUSCH (Physical Uplink Shared Channel), PUCCH (Physical Uplink Control Channel), and SRS (Sound Reference Signal) transmit power.

7 Uplink Power Control

Uplink power control determines a power for PUSCH, PUCCH, SRS, and PRACH transmissions.

A UE does not expect to simultaneously maintain more than four pathloss estimates per serving cell for all PUSCH/PUCCH/SRS transmissions as described in Subclauses 7.1.1, 7.2.1, and 7.3.1.

A PUSCH/PUCCH/SRS/PRACH transmission occasion i is defined by a slot index $n_{s,f}^\mu$ within a frame with system frame number SFN, a first symbol S within the slot, and a number of consecutive symbols L.

7.1 Physical Uplink Shared Channel

For a PUSCH transmission on active UL BWP b, as described in Subclause 12, of carrier f of serving cell c, a UE first calculates a linear value $\hat{P}_{PUSCH,b,f,c}(i,j,q_d,l)$ of the transmit power $P_{PUSCH,b,f,c}(i,j,q_d,l)$, with parameters as defined in Subclause 7.1.1. [ ... ]

7.1.1 UE Behaviour

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i,j,q_d,l) = \min\begin{Bmatrix} P_{CMAX,f,c}(i), \\ P_{O\_PUSCH,b,f,c}(j) + 10\log_{10}\\ (2^\mu \cdot M_{RB,b,f,c}^{PUSCH}(i)) + \\ \alpha_{b,f,c}(j) \cdot PL_{b,f,c}(q_d) + \\ \Delta_{TF,b,f,c}(i) + f_{b,f,c}(i,l) \end{Bmatrix} [dBm]$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,f,c}(i)$ is a parameter composed of the sum of a component $P_{O\_NOMINAL\_PUSCH,f,c}(i)$ and a component $P_{O\_UE\_PUSCH,b,f,c}(j)$ where $j \in \{0, 1, \ldots, J-1\}$.

[ ... ]

For $\alpha_{b,f,c}(j)$

[ ... ]

$M_{RB,b,f,c}^{PUSCH}(i)$ is the bandwidth of the PUSCH resource assignment expressed in number of resource blocks for PUSCH transmission occasion i on active UL BWP b of carrier f of serving cell c and $\mu$ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Subclause 12, of carrier f of serving cell c

- If the UE is not provided PUSCH-PathlossReferenceRS or before the UE is provided dedicated higher layer parameters, the UE calculates $PL_{b,f,c}(q_d)$ using a RS resource from the SS/PBCH block that the UE uses to obtain MIB
- If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS
- If the PUSCH transmission is scheduled by a RAR UL grant as described in Subclause 8.3, the UE uses the same RS resource index $q_d$ as for a corresponding PRACH transmission
- If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes a SRI field, the UE determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking
- If the PUSCH transmission is scheduled by a DCI format 0_0, and if the UE is provided a spatial setting by PUCCH-SpatialRelationInfo for a PUCCH resource with a lowest index for active UL BWP b of each carrier f and serving cell c, as described in Subclause 9.2.2, the UE uses the same RS resource index $q_d$ as for a PUCCH transmission in the PUCCH resource with the lowest index
- If the PUSCH transmission is scheduled by a DCI format 0_0 and if the UE is not provided a spatial setting for a PUCCH transmission, or by a DCI format 0_1 that does not include a SRI field, or if SRI-PUSCH-PowerControl is not provided to the UE, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking
- For a PUSCH transmission configured by ConfiguredGrantConfig, if rrc-ConfiguredUplinkGrant is included in ConfiguredGrantConfig, a RS resource index $q_d$ is provided by a value of pathlossReferenceIndex included in rrc-Configured UplinkG rant where the RS resource is either on serving cell c or, if provided, on a serving cell indicated by a value of pathlossReferenceLinking
- For a PUSCH transmission configured by ConfiguredGrantConfig that does not include rrc-ConfiguredUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include a SRI field, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking $PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-Block-Power. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

[ . . . ]

7.2 Physical Uplink Control Channel

[ . . . ]

7.2.1 UE Behaviour

If a UE transmits a PUCCH on active UL BWP b of carrier f in the primary cell c using PUCCH power control adjustment state with index l, the UE determines the PUCCH transmission power $P_{PUCCH,b,f,c}(i,q_u,q_d,l)$ in PUCCH transmission occasion i as $$P_{PUCCH,b,f,c}(i, q_u, q_d, l) = \min \begin{Bmatrix} P_{CMAX,f,c}(i), \\ P_{O\_PUCCH,b,f,c}(q_u) + \\ 10\log_{10}(2^\mu \cdot M_{RB,b,f,c}^{PUCCH}(i)) + \\ PL_{b,f,c}(q_d) + \\ \Delta_{F\_PUCCH}(F) + \\ \Delta_{TF,b,f,c}(i) + g_{b,f,c}(i, l) \end{Bmatrix} [dBm]$$

where $P_{CMAX,f,c}(i)$ is the UE configured maximum output power defined in [8-1, TS 38.101-1], [8-2, TS38.101-2] and [8-3, TS38.101-3] for carrier f of serving cell c in PUCCH transmission occasion i $P_{O\_PUCCH,b,f,c}(q_u)$ is a parameter composed of the sum of a component $P_{O\_NOMINAL\_PUCCH}$, provided by p0-nominal, or $P_{O\_NOMINAL\_PUCCH}$=0 dBm if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0 \leq q_u << Q_u$. $Q_u$ is a size for a set of $P_{O\_UE\_PUCCH}$ values provided by maxNrofPUCCH-P0-PerSet. The set of $P_{O\_UE\_PUCCH}$ values is provided by p0-Set. If p0-Set is not provided to the UE, $P_{O\_UE\_PUCCH}(q_u)$=0, $0 \leq q_u < Q_u$

[ . . . ]

$M_{RB,b,f,c}^{PUCCH}(i)$ is a bandwidth of the PUCCH resource assignment expressed in number of resource blocks for PUCCH transmission occasion i on active UL BWP b of carrier f of serving cell c and $\mu$ is a SCS configuration defined in [4, TS 38.211]

$PL_{b,f,c}(q_d)$ is a downlink pathloss estimate in dB calculated by the UE using RS resource index $q_d$ as described in Subclause 7.1.1 for the active DL BWP b of carrier f of the primary cell c as described in Subclause 12

If the UE is not provided pathlossReferenceRSs or before the UE is provided dedicated higher layer parameters, the UE calculates $PL_{b,f,c}(q_d)$ using a RS resource obtained from the SS/PBCH block that the UE uses to obtain MIB If the UE is provided a number of RS resource indexes, the UE calculates $PL_{b,f,c}(q_d)$ using RS resource with index $q_d$, where $0 \leq q_d < Q_d \cdot Q_d$ is a size for a set of RS resources provided by maxNrofPUCCH-Pathloss-ReferenceRSs. The set of RS resources is provided by pathlossReferenceRSs. The set of RS resources can include one or both of a set of SS/PBCH block indexes, each provided by ssb-Index in PUCCH-PathlossReferenceRS when a value of a corresponding pucch-PathlossReferenceRS-Id maps to a SS/PBCH block index, and a set of CSI-RS resource indexes, each provided by csi-RS-Index when a value of a corresponding pucch-PathlossReferenceRS-Id maps to a CSI-RS resource index. The UE identifies a RS resource in the set of RS resources to correspond either to a SS/PBCH block index or to a CSI-RS resource index as provided by pucch-PathlossReferenceRS-Id in PUCCH-PathlossReferenceRS If the UE is provided pathlossReferenceRSs and PUCCH-SpatialRelationInfo, the UE obtains a mapping, by indexes provided by corresponding values of pucch-PathlossReferenceRS-Id, between a set of pucch-SpatialRelationInfoId values and a set of referencesignal values provided by PUCCH-PathlossReferenceRS. If the UE is provided more than one values for pucch-SpatialRelationInfoId and the UE receives an activation command [11, TS 38.321] indicating a value of pucch-SpatialRelationInfoId, the UE determines the referencesignal value in PUCCH-PathlossReferenceRS through the link to a corresponding pucch-PathlossReferenceRS-Id index. The UE applies the activation command in the first slot that is after slot $k+3 \cdot N_{slot}^{subframe,\mu}$ where k is the slot where the UE transmits a PUCCH with HARQ-ACK information for the PDSCH providing the activation command and $\mu$ is the SCS configuration for the PUCCH transmission If PUCCH-SpatialRelationInfo includes servingCellId indicating a serving cell, the UE receives the RS for resource index $q_d$ on the active DL BWP of the serving cell If the UE is provided pathlossReferenceRSs and is not provided PUCCH-SpatialRelationInfo, the UE obtains the referencesignal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking The parameter $\Delta_{F\_PUCCH}(F)$ is provided by deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4

[ . . . ]

7.3 Sounding Reference Signals

For SRS, a UE splits a linear value $\hat{P}_{SRS,b,f,c}(i,q_s,l)$ of the transmit power $P_{SRS,b,f,c}(i,q_s,l)$ on active UL BWP b of carrier f of serving cell c equally across the configured antenna ports for SRS.

7.3.1 UE Behaviour

If a UE transmits SRS on active UL BWP b of carrier f of serving cell c using SRS power control adjustment state with index l, the UE determines the SRS transmission power $P_{SRS,b,f,c}(i,q_s,l)$ in SRS transmission occasion i as $$P_{SRS,b,f,c}(i, q_s, l) = \min \begin{Bmatrix} P_{CMAX,f,c}(i), \\ P_{O\_SRS,b,f,c}(q_s) + \\ 10\log_{10} \\ (2^{\mu} \cdot M_{SRS,b,f,c}(i)) + \\ \alpha_{SRS,b,f,c}(q_s) \cdot \\ PL_{b,f,c}(q_d) + \\ h_{b,f,c}(i, l) \end{Bmatrix}$ [dBm]

where, $P_{CMAX,f,c}(i)$ is the UE configured maximum output power defined in [8, TS 38.101-1], [8-2, TS38.101-2] and [TS 38.101-3] for carrier f of serving cell c in SRS transmission occasion i $P_{O\_SRS,b,f,c}(q_s)$ is provided by p0 for active UL BWP b of carrier f of serving cell c and SRS resource set $q_s$ provided by SRS-ResourceSet and SRS-ResourceSetId $M_{SRS,b,f,c}(i)$ is a SRS bandwidth expressed in number of resource blocks for SRS transmission occasion i on active UL BWP b of carrier f of serving cell c and μ is a SCS configuration defined in [4, TS 38.211]

$\alpha_{SRS,b,f,c}(q_s)$ is provided by alpha for active UL BWP b of carrier f of serving cell c and SRS resource set $q_s$ $PL_{b,f,c}(q_d)$ is a downlink pathloss estimate in dB calculated by the UE using RS resource index $q_d$ as described in Subclause 7.1.1 for the active DL BWP of serving cell c and SRS resource set $q_s$ [6, TS 38.214]. The RS resource index $q_d$ is provided by pathlossReferenceRS associated with the SRS resource set $q_s$ and is either a ssb-Index providing a SS/PBCH block index or a csi-RS-Index providing a CSI-RS resource index If the UE is not provided pathlossReferenceRS or before the UE is provided dedicated higher layer parameters, the UE calculates $PL_{b,f,c}(q_d)$ using a RS resource obtained from the SS/PBCH block that the UE uses to obtain MIB If the UE is provided pathlossReferenceLinking, the RS resource is on a serving cell indicated by a value of pathlossReferenceLinking

[ . . . ]

7.4 Physical Random Access Channel

A UE determines a transmission power for a physical random access channel (PRACH), $P_{PRACH,b,f,c}(i)$, on active UL BWP b of carrier f of serving cell c based on DL RS for serving cell c in transmission occasion i as $$P_{PRACH,b,f,c}(i) = \min\{P_{CMAX,f,c}(i), P_{PRACH,target,f,c} + PL_{b,f,c}\} \text{ [dBm]},$$

where $P_{CMAX,f,c}(i)$ is the UE configured maximum output power defined in [8-1, TS 38.101-1], [8-2, TS38.101-2] and [38.101-3] for carrier f of serving cell c within transmission occasion i, $P_{PRACH,target,f,c}$ is the PRACH target reception power PREAMBLE_RECEIVED_TARGET_POWER provided by higher layers [11, TS 38.321] for the active UL BWP b of carrier f of serving cell c, and $PL_{b,f,c}$ is a pathloss for the active UL BWP b of carrier f based on the DL RS associated with the PRACH transmission on the active DL BWP of serving cell c and calculated by the UE in dB as referenceSignalPower–higher layer filtered RSRP in dBm, where RSRP is defined in [7, TS 38.215] and the higher layer filter configuration is defined in [12, TS 38.331]. If the active DL BWP is the initial DL BWP and for SS/PBCH block and CORESET multiplexing pattern 2 or 3, as described in Subclause 13, the UE determines $PL_{b,f,c}$ based on the SS/PBCH block associated with the PRACH transmission.

If a PRACH transmission from a UE is not in response to a detection of a PDCCH order by the UE, or is in response to a detection of a PDCCH order by the UE that triggers a contention based random access procedure, or is associated with a link recovery procedure where a corresponding index $q_{new}$ is associated with a SS/PBCH block, as described in Subclause 6, referenceSignalPower is provided by ss-PBCH-BlockPower.

If a PRACH transmission from a UE is in response to a detection of a PDCCH order by the UE that triggers a non-contention based random access procedure and depending on the DL RS that the DM-RS of the PDCCH order is quasi-collocated with as described in Subclause 10.1, referenceSignalPower is provided by ss-PBCH-BlockPower or, if the UE is configured resources for a periodic CSI-RS reception or the PRACH transmission is associated with a link recovery procedure where a corresponding index $q_{new}$ is associated with a periodic CSI-RS configuration as described in Subclause 6, referenceSignalPower is obtained by ss-PBCH-BlockPower and powerControlOffsetSS where powerControlOffsetSS provides an offset of CSI-RS transmission power relative to SS/PBCH block transmission power [6, TS 38.214]. If powerControlOffsetSS is not provided to the UE, the UE assumes an offset of 0 dB. If the active TCI state for the PDCCH that provides the PDCCH order includes two RS, the UE expects that one RS has QCL-TypeD properties and the UE uses the one RS when applying a value provided by powerControlOffsetSS.

If within a random access response window, as described in Subclause 8.2, the UE does not receive a random access response that contains a preamble identifier corresponding to the preamble sequence transmitted by the UE, the UE determines a transmission power for a subsequent PRACH transmission, if any, as described in [11, TS 38.321].

In RAN1 #94 meeting (as captured in 3GPP R1-1810051), RAN1 has some agreements about NR V2X.

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.

[ . . . ]

Agreements:

At least PSCCH and PSSCH are defined for NR V2X. PSCCH at least carries information necessary to decode PSSCH.

[ . . . ]

Agreements:

RAN1 to continue study on multiplexing physical channels considering at least the above aspects:

Multiplexing of PSCCH and the associated PSSCH (here, the "associated" means that the PSCCH at least carries information necessary to decode the PSSCH).

Study further the following options:

[ . . . ]

Option 3: A part of PSCCH and the associated PSSCH are transmitted using overlapping time resources in non-overlapping frequency resources, but another part of the associated PSSCH and/or another part of the PSCCH are transmitted using non-overlapping time resources.

[ . . . ]
Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources
In RAN1 #94bis meeting (as captured in 3GPP R1-1812101), RAN1 has some agreements about NR V2X.
Agreements:
For unicast, sidelink HARQ feedback and HARQ combining in the physical layer are supported.
FFS details, including the possibility of disabling HARQ in some scenarios
For groupcast, sidelink HARQ feedback and HARQ combining in the physical layer are supported.
FFS details, including the possibility of disabling HARQ in some scenarios
Conclusion:
To update the TR 37.885 by replacing "multicast" by "groupcast"
Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.
FFS whether a solution will use only one of "ACK," "NACK," "DTX," or use a combination of them.
Agreements:
At least resource pool is supported for NR sidelink
Resource pool is a set of time and frequency resources that can be used for sidelink transmission and/or reception.
[ . . . ]
UE assumes a single numerology in using a resource pool.
Multiple resource pools can be configured to a single UE in a given carrier.
In RAN1 #95 meeting (as captured in 3GPP R1-1901482), RAN1 has some agreements about NR V2X.
Agreements:
BWP is defined for NR sidelink.
In a licensed carrier, SL BWP is defined separately from BWP for Uu from the specification perspective. FFS the relation with Uu BWP.
The same SL BWP is used for both Tx and Rx.
Each resource pool is (pre)configured within a SL BWP.
Only one SL BWP is (pre)configured for RRC idle or out of coverage NR V2X UEs in a carrier.
For RRC connected UEs, only one SL BWP is active in a carrier. No signalling is exchanged in sidelink for activation and deactivation of SL BWP.
Working assumption: only one SL BWP is configured in a carrier for a NR V2X UE
Revisit in the next meeting if significant issues are found
Numerology is a part of SL BWP configuration.
Agreements:
Physical sidelink feedback channel (PSFCH) is defined and it is supported to convey SFCI for unicast and groupcast via PSFCH.
Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise. [ . . . ]
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.
[ . . . ]
In RAN1 #AH_1901 meeting (as captured in 3GPP R1-1901483), RAN1 has some agreements about NR V2X.
Agreements:
Confirm the working assumption
Working assumption: only one SL BWP is configured in a carrier for a NR V2X UE
Agreements:
Configuration for SL BWP is separated from Uu BWP configuration signalling.
UE is not expected to use different numerology in the configured SL BWP and active UL BWP in the same carrier at a given time.
Agreements:
SL open-loop power control is supported.
For unicast, groupcast, broadcast, it is supported that the open-loop power control is based on the pathloss between TX UE and gNB (if TX UE is in-coverage). This is at least to mitigate interference to UL reception at gNB.
Rel-14 LTE sidelink open-loop power control is the baseline.
gNB should be able to enable/disable this power control.
At least for unicast, it is supported that the open-loop power control is also based on the pathloss between TX UE and RX UE.
(Pre-)configuration should be able to enable/disable this power control.
FFS whether this is applicable to groupcast
FFS whether this requires information signaling in the sidelink.
Further study its potential impact, e.g., on resource allocation.
Agreements:
Long-term measurement of sidelink signal is supported at least for unicast.
Long-term measurement here means a measurement with L3 filtering.
This measurement is used at least for the open-loop power control.

In RAN1 #96 meeting (as captured in 3GPP R1-1905837), RAN1 has some agreements about NR V2X.

Agreements:

For the operation regarding PSSCH, a UE performs either transmission or reception in a slot on a carrier.

Agreements:

For unicast RX UEs, SL-RSRP is reported to TX UE

For sidelink open loop power control for unicast for the TX UE, TX UE derives pathloss estimation
  Revisit during the WI phase w.r.t. whether or not there is a need regarding how to handle pathloss estimation for OLPC before SL-RSRP is available for a RX UE Agreements:

TPC commands for SL PC are not supported

Agreements:

RAN1 concludes the following regarding beam management:
  Beam management is beneficial
  RAN1 has conducted limited study on the beam management.
  In FR1, it is feasible to support V2X use cases without beam management.
  In FR2, it is feasible to support some V2X use cases without beam management in some scenarios.
    Panel selection is necessary to improve the communication range in FR2.

In RAN1 #97 meeting (as captured in the Draft Report of 3GPP TSG RAN WG1 #97 v0.1.0), RAN1 has some agreements about NR V2X.

Agreements:

For mode 1:
  A dynamic grant by the gNB provides resources for transmission of PSCCH and PSSCH.

Agreements:

Resource selection window is defined as a time interval where a UE selects sidelink resources for transmission
  The resource selection window starts T1≥0 after a resource (re-)selection trigger and is bounded by at least a remaining packet delay budget Agreements:

Support a sub-channel as the minimum granularity in frequency domain for the sensing for PSSCH resource selection Agreements:

For sidelink transmit power control,
  Total sidelink transmit power is the same in the symbols used for PSCCH/PSSCH transmissions in a slot.
    FFS whether/how to handle simultaneous transmission of sidelink and uplink
  The maximum SL transmit power is (pre-)configured to the TX UE.
    FFS on details (e.g., whether the maximum power is dependent of parameters such as the priority of PSCCH/PSSCH)

Agreements:

For the SL open-loop power control, a UE can be configured to use DL pathloss (between TX UE and gNB) only, SL pathloss (between TX UE and RX UE) only, or both DL pathloss and SL pathloss.

When the SL open-loop power control is configured to use both DL pathloss and SL pathloss,
  The minimum of the power values given by open-loop power control based on DL pathloss and the open-loop power control based on SL pathloss is taken.
    (Working assumption) P0 and alpha values are separately (pre-)configured for DL pathloss and SL pathloss.

3GPP R1-1907682 summaries company's view about sidelink power control.

2. Sidelink Power Control

Issue 2-1: How to perform SL TX power control for PSCCH and PSSCH considering PSCCH/PSSCH multiplexing Option 3? In detail, company's view and its rationale are as follows:

Proposal for agreement (offline consensus)

For sidelink transmit power control,
  Total sidelink transmit power is the same in the symbols used for PSCCH/PSSCH transmissions in a slot.
    FFS whether/how to handle simultaneous transmission of sidelink and uplink
  The maximum SL transmit power is (pre-)configured to the TX UE.
    FFS on details (e.g., whether the maximum power is dependent of parameters such as the priority of PSCCH/PSSCH)

Issue 2-2: How to use SL pathloss-based open-loop power control? In detail, company's view and its rationale are as follows:

Observation

Majority companies support open-loop power control based on the pathloss between Tx UE and Rx UE for groupcast, and there is a comment that SL-RSRP reporting may create high traffic load in the network.
  Companies are encouraged to continue to discuss whether SL pathloss-based open-loop power control is applicable to groupcast considering signaling overhead for SL-RSRP reporting.

Majority companies support taking the minimum of the power calculated by DL pathloss and SL pathloss when both DL pathloss and SL pathloss are enabled.
  Companies are encouraged to further discuss whether SL pathloss is used for open-loop power control for PSCCH or PSFCH Proposal for agreement (offline consensus)

For the SL open-loop power control, a UE can be configured to use DL pathloss (between TX UE and gNB) only, SL pathloss (between TX UE and RX UE) only, or both DL pathloss and SL pathloss.

When the SL open-loop power control is configured to use both DL pathloss and SL pathloss,
  The minimum of the power values given by open-loop power control based on DL pathloss and the open-loop power control based on SL pathloss is taken.
  P0 and alpha values are separately (pre-)configured for DL pathloss and SL pathloss.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request (SR), channel state information (CSI), HARQ-ACK/NACK for downlink transmission Slot: a scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: Data channel carrying common information that targets for multiple UEs in a cell or all UEs in a cell. Examples of DL common signal could be system information, paging, RAR.

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

For LTE/LTE-A V2X (Vehicle-to-Everything) and/or P2X (Pedestrian-to-Everything) transmission, there are two transmission modes: one is scheduled via network, such as sidelink transmission mode 3 (as discussed in 3GPP TS 36.214); the other one is resource selection by device, such as sidelink transmission mode 4 (as discussed in 3GPP TS 36.214). Since the resource selection by device is not scheduled via network, the UE requires performing sensing before selecting a resource for transmission, in order to avoid resource collision and interference from or in other UEs. In LTE/LTE-A Release 14, a V2X resource pool is configured with one of transmission modes. Thus, the two transmission modes are not mixed utilized in a V2X resource pool. In LTE/LTE-A Release 15, it is supported that the two transmission modes can be mixed utilized in a V2X resource pool.

For sidelink transmission mode 3, the network node may transmit a sidelink (SL) grant, e.g. DCI (Downlink Control Information) format 5A in LTE/LTE-A, on Uu interface for scheduling PSCCH (Physical Sidelink Control Channel) and/or PSSCH (Physical Sidelink Shared Channel). The V2X UE may perform PSCCH and PSSCH on PC5 interface, in response to the receive DCI format 5A. Note that the V2X UE does not feedback HARQ-ACK associated with reception the DCI format 5A to network node. The Uu interface means the wireless interface for communication between network and UE. The PC5 interface means the wireless interface for communication between UEs.

A DCI format 5A may schedule one transmission occasion of PSCCH and/or PSSCH, wherein the DCI format 5A is with CRC scrambled via SL-V-RNTI (Sidelink V2X RNTI). Alternative, the DCI format 5A may schedule semi-persistent periodic transmission occasions of PSCCH and/or PSSCH, wherein the DCI format 5A is with CRC scrambled via SL-SPS-V-RNTI. More specifically, the DCI format 5A with CRC scrambled via SL-SPS-V-RNTI may activate or release semi-persistent periodic transmission occasions of PSCCH and/or PSSCH. The periodicity may be configured in RRC with one of 20, 50, 100, 200, . . . , 1000 ms.

For one transmission occasion, the UE performs a PSSCH (new) transmission and/or a PSSCH retransmission for a transport block. For n transmission occasions, the UE performs n PSSCH (new) transmissions and/or n PSSCH retransmissions for n transport blocks.

For both transmission mode 3 and 4 for LTE/LTE-A V2X and/or P2X transmission, the transmission power of PSCCH and PSSCH only supports open-loop power control. It means that the transmit power of PSCCH and PSSCH is determined by resource bandwidth, power parameters (such as P0 and/or $\alpha$), and a downlink pathloss (PL). The downlink pathloss is derived from measuring DL RS (DownLink Reference Signal) transmitted from network node. The power parameter is (semi-statically) configured. Thus, the network node does not dynamically adjust the transmit power of PSCCH and PSSCH from a transmitter UE, i.e. power control (TPC) command is not supported for V2X sidelink communication. Since the V2X and P2X transmission in LTE/LTE-A is designed for broadcast transmission, there is no need for network to fine tune the transmit power. The network only needs to ensure that the PSCCH and PSSCH transmissions do not induce severe interference for other UEs in Uu interface. Thus, that is why downlink pathloss between network node and the transmitter UE is one parameter for deriving transmit power of PSCCH and/or PSSCH. Moreover, $P_{CMAX}$ and $P_{MAX\_CBR}$ for transmission mode 4 are considered as maximum transmit power restriction for PSCCH and PSSCH transmissions.

In NR V2X, unicast, groupcast, and broadcast sidelink transmission are supported. At least two sidelink resource allocation modes are defined for NR-V2X sidelink communication. Mode 1 is that base station or network node can schedule sidelink resource(s) to be used by UE for sidelink transmission(s). Mode 2 is that UE determines (i.e. base station or network node does not schedule) sidelink transmission resource(s) within sidelink resources configured by base station or network node or pre-configured sidelink resources. The mode 3 in LTE V2X may be a start point or basis for study mode 1 in NR V2X. The mode 4 in LTE V2X may be a start point or basis for study mode 2 in NR V2X.

To increase high reliability and reduce interference, it may be considered to enhance sidelink power control. Since there are specific one or multiple receiving devices for unicast and groupcast transmissions, the transmission power derivation may be enhanced with consideration of channel quality and propagation pathloss between transmitting device and receiving device(s). With accurate transmit power control, the reception reliability of V2X transmission can be guaranteed without inducing unnecessary interference to other devices. Power utilization is more efficient without wasting unnecessary transmit power.

Currently, it is agreed to support sidelink pathloss based open-loop power control at least for unicast. The sidelink pathloss based open-loop power control means that the pathloss for deriving sidelink transmit power is the propagation pathloss between device and device, instead of between network node and device. It is because the pathloss between device and device may reflect the required power for reception more accurately. If the distance between device and device is longer, more pathloss compensation will be required for sidelink communication between the two devices. If the distance between device and device is shorter, less pathloss compensation will be required for sidelink communication between the two devices. One possible embodiment is that a device A transmits a signal in PC5 interface, and a device B measures the signal and derives a sidelink pathloss value. When the device B transmits a sidelink channel transmission to the device A, the transmit power of the sidelink channel transmission may be derived from the derived sidelink pathloss value.

In one embodiment, if the device B knows the transmit power of the signal at device A, the sidelink pathloss value may be derived as the transmit power of the signal minus the received power of the signal at device B. The received power may mean RSRP (Reference Signal Received Power). Moreover, the device B may report a measured power of the signal to the device A (such as SL RSRP report). The device A can derive the sidelink pathloss value based on the report, and then derives a transmit power of sidelink channel transmission to the device B.

Furthermore, it is agreed that open-loop power control for unicast, groupcast, broadcast sidelink transmission can be based on the pathloss between TX device and gNB (if TX device is in-coverage). This is to mitigate interference to UL (Uplink) reception at gNB.

Based on the RAN1 agreement for the SL open-loop power control (as captured in 3GPP R1-1905921), a device can be configured to use DL pathloss (between TX UE and gNB) only, SL pathloss (between TX UE and RX UE) only, or both DL pathloss and SL pathloss. When the SL open-loop power control is configured to use both DL pathloss and SL pathloss, the minimum of the power values given by open-loop power control based on DL pathloss and the open-loop power control based on SL pathloss is taken.

Preferably, P0 and alpha values may be separately (pre-)configured for DL pathloss and SL pathloss.

In NR Uu interface, there are some alternatives for deriving DL (Downlink) pathloss, which is used for determining uplink transmit power, such as for PUSCH, PUCCH, SRS, and PRACH (Physical Random Access Channel). Such alternatives are to consider beam operation, since the network node may transmit different channels or different reference signal in respective network beam. More specifically, SS (Synchronization)/PBCH (Physical Broadcast Channel) block with different indexes may be transmitted from different network beams. CSI-RS (Channel State Information-Reference Signal) with different resource indexes may be transmitted from different network beams. Even downlink channel transmission in different TTIs (Transmission Time Intervals) may be transmitted from different network beams, thus DMRS (Demodulation Reference Signal) of downlink channel transmissions in different TTIs may not be considered as quasi-collocated with each other. Such alternatives applied for NR uplink transmissions (as discussed in 3GPP TS 38.213) are summarized as shown in FIG. 8.

For a PRACH transmission, the DL pathloss for determining the PRACH transmission power is derived based on the DL RS associated with the PRACH transmission (such as associated SS/PBCH block). Such association between DL RS and PRACH may be configured. In general, the DL RS may be a SS/PBCH block. In some cases, the DL RS may be a periodic CSI-RS.

Depending on different situations, the DL pathloss for determining SRS transmit power can be derived based on a SS/PBCH block that the UE uses to obtain MIB (Master Information Block), or DL RS associated with a configured RS resource index. The RS index may correspond to a SS/PBCH block index or a CSI-RS resource index.

Depending on different situations, the DL pathloss for determining PUCCH transmit power can be derived based on a SS/PBCH block that the UE uses to obtain MIB, DL RS associated with a RS resource index indicated by MAC activation command, or DL RS associated with a RS resource index with index 0. The RS index may correspond to a SS/PBCH block index or a CSI-RS resource index.

Depending on different situations, the DL pathloss for determining PUSCH transmit power can be derived based on a SS/PBCH block that the UE uses to obtain MIB, DL RS associated with a RS resource index as for corresponding PRACH (if the PUSCH is msg3), DL RS associated with a RS resource index mapped to indicated SRI field, DL RS associated with a RS resource index for PUCCH transmission in the PUCCH resource with the lowest index, DL RS associated with a RS resource index with index 0, or DL RS associated with a configured RS resource index. The RS index may correspond to a SS/PBCH block index or a CSI-RS resource index.

However, for determining sidelink transmit power, it is not clear how to obtain or derive required DL pathloss. In one way, the DL pathloss derivation for sidelink may select one or more than one alternatives applied for NR uplink transmissions. Moreover, new alternative may be required considering different characteristics between sidelink and uplink.

First consideration is that a device performing sidelink transmission or reception may be RRC-idle mode in Uu interface. It means that the device has no configuration about DL RS resource index and its correspondence. The V2X device has no configuration about CSI-RS resources. The V2X device has no configuration or information about the SS (Synchronization Signal) or PBCH (Physical Broadcast Channel) block occasions, which are really transmitted by network node. The device may not perform PRACH transmission. Thus, almost all alternatives are not applied for the device in RRC-idle mode.

Second consideration is that the network node may not keep tracking for a device. It is especially for the device operated or configured as mode 2 for sidelink transmission. Since the device obtains or selects sidelink resource based on sensing without network assistance or scheduling, the network node may have no need to adjust DL network beams of DL RSs for the device in time. Accordingly, the DL network beams of the DL RSs does not direct or point toward the device accurately, thus the DL pathloss derived based on the DL RSs is not accurate or valid for the device to determine sidelink transmit power.

Third consideration is that a sidelink transmission from a transmitting device is for successful reception of one or more than one receiving device, instead of successful reception of network node. For downlink and sidelink, there is no close or tight linkage as that between (DL beam of) a DL RS and (UL beam of) a UL transmission in Uu interface. In other words, if the network node expects to receive a UL transmission on one network beam, the network may indicate the device to perform the UL transmission on one device beam corresponding to the one network beam, where a DL pathloss for determining UL transmit power of the UL transmission is derived based on a DL RS transmitted on the one network beam. However, since the network may not need to receive sidelink transmission from a device, the DL pathloss for determining sidelink transmit power may be derived based on DL RS without limitation on any specific network beam. In this case, a network beam with smallest DL pathloss may be properly considered for determining sidelink transmit power.

To determine sidelink transmit power, following are some methods to obtain or derive required DL pathloss.

Method A

The general concept of method A is that a transmitting device may receive a downlink control transmission from network. In one embodiment, the downlink control transmission may deliver or include a grant, wherein the grant may indicate one or multiple sidelink resources. Alternatively, the downlink control transmission may schedule a downlink data transmission delivering system information for sidelink communication. The DL pathloss for determining the sidelink transmit power may be derived based on a DL RS associated with reception, monitoring, or detection of the downlink control transmission.

In one embodiment, the transmitting device may be configured with network scheduling mode, such as NR mode 1, for sidelink transmission. The transmitting device may be configured with a mixed mode supporting network scheduling mode and/or device self-determination mode, such as NR mode 1 and/or mode 2, for sidelink transmission. In the case, the transmitting device may derive DL pathloss, for determining the sidelink transmit power, based on a DL RS associated with reception, monitoring, or detection of the downlink control transmission, wherein the downlink control transmission may deliver or include the grant for sidelink or may schedule a downlink data transmission delivering system information for sidelink communication.

In one embodiment, the transmitting device may be configured with device self-determination mode, such as NR mode 2, for sidelink transmission. In this case, the transmitting device may derive DL pathloss, for determining the sidelink transmit power, based on a DL RS associated with reception, monitoring, or detection of the downlink control transmission, wherein the downlink control transmission may schedule a downlink data transmission delivering system information for sidelink communication. It is because that the transmitting device configured with device self-determination mode may not receive or monitor the grant for sidelink.

In one embodiment, the transmitting device may derive a DL pathloss value based on DMRS (Demodulation Reference Signal) of the downlink control transmission. The DMRS is utilized for demodulation of the downlink control transmission. The DL pathloss value may be calculated by L1-RSRP. The RSRP may be DMRS-RSRP.

In one embodiment, the transmitting device may derive a DL pathloss value based on a DL RS or DMRS associated with a CORESET (Control Resource Set), wherein the transmitting device receives, monitors, or detects the downlink control transmission in the CORESET. The DL RS may mean a SS or PBCH block or a CSI-RS. The DMRS is utilized for demodulation of the downlink control transmission. In one embodiment, the DL pathloss value may be calculated by L1-RSRP. Alternatively, the DL pathloss value may be calculated by higher layer filtered -RSRP. The RSRP may be any of SS-RSRP, CSI-RSRP, or DMRS-RSRP.

In one embodiment, the transmitting device may derive a DL pathloss value based on a DL RS or DMRS associated with a specific CORESET. The specific CORESET may mean a CORESET with index zero. The specific CORESET may be configured by network node, such as based on a configured CORESET index.

Alternatively, the specific CORESET may mean:
a CORESET in which the transmitting device receives a last or most recent downlink control transmission with the grant;
a CORESET in which the transmitting device receives a last or most recent downlink control transmission which schedules a downlink data transmission delivering system information for sidelink communication;
a last or most recent CORESET in which the transmitting device monitors a downlink control transmission for a grant; or
a last or most recent CORESET in which the transmitting device monitors a downlink control transmission for acquiring system information for sidelink communication.

In one embodiment, the transmitting device may receive, monitor, or detect the downlink control transmission in the specific CORESET. Alternatively, the transmitting device may receive, monitor, or detect multiple CORESETs, wherein the multiple CORESETs comprise the specific CORESET. The DL RS may mean a SS or PBCH block or a CSI-RS. The DMRS may be utilized for demodulation of the downlink control transmission. In one embodiment, the DL pathloss value may be calculated by L1-RSRP. Alternatively, the DL pathloss value may be calculated by higher layer filtered -RSRP. The RSRP may be any of SS-RSRP, CSI-RSRP, or DMRS-RSRP.

In one embodiment, the transmitting device may perform one or multiple sidelink transmission(s) on the one or multiple sidelink resources, such as given by the grant or selected by the transmitting device. The sidelink transmit power of the one or multiple sidelink transmission(s) is determined or derived based on the DL pathloss value. In one embodiment, a power value derived based on the DL pathloss value may be an upper bound of sidelink transmit power of the one or multiple sidelink transmission(s).

Figure 9:
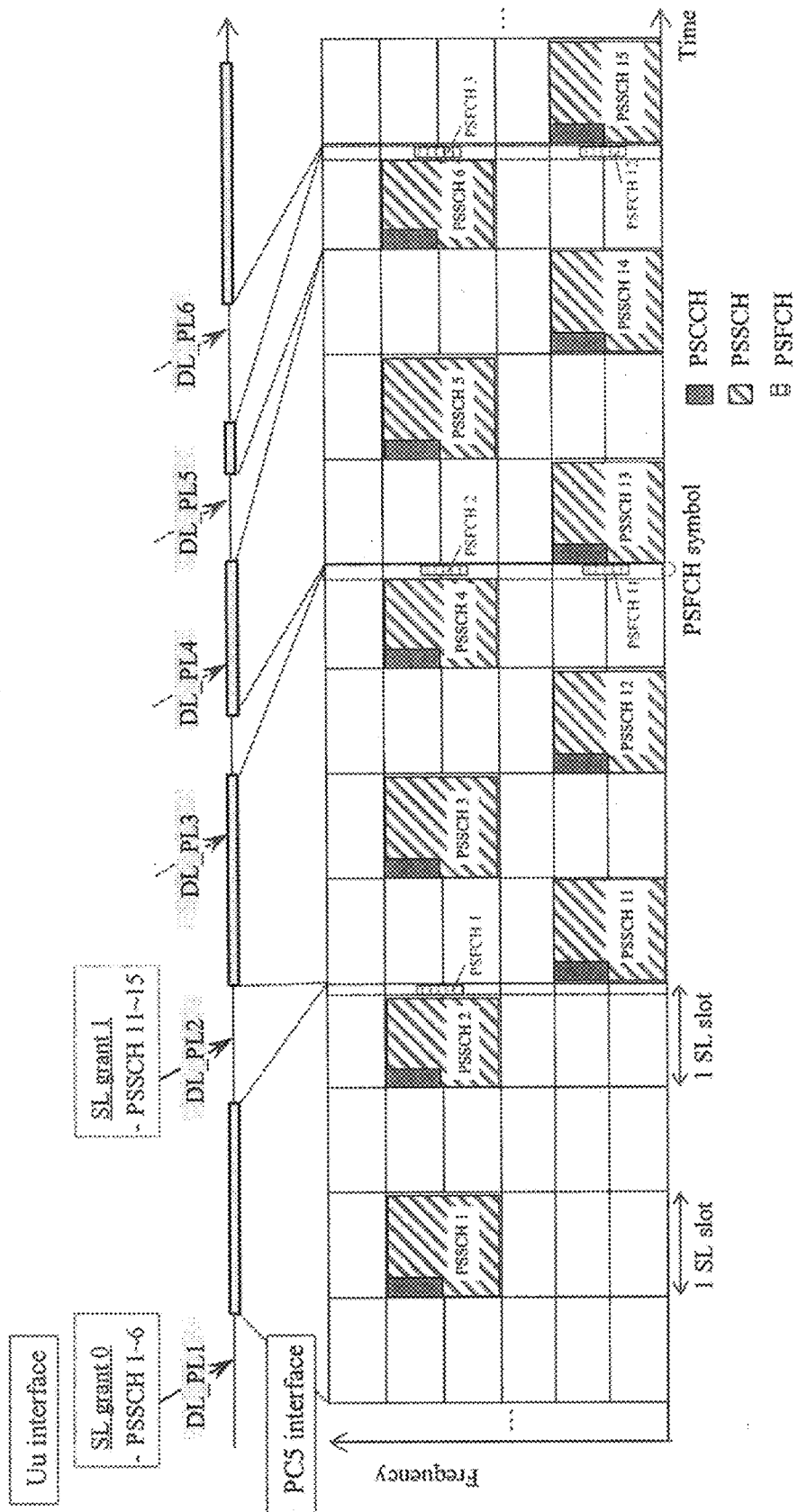
FIG. 9 is a diagram according to one exemplary embodiment.

FIG. 9 shows multiple possible embodiments. For a sidelink resource pool, the sidelink resources in time domain may occupy a subset of slots utilized for sidelink, i.e. sidelink slots. Within a slot, all the symbols or only a subset of consecutive symbols may be available for sidelink. Moreover, within the sidelink slots associated with the resource pool, PSFCH resources can be (pre)configured periodically with a period of N sidelink slot(s). N is assumed to be 4 in FIG. 9.

The transmitting device may receive DL transmission, channel, or RS (Reference Signal) in DL symbols and/or DL slots. The transmitting device may derive DL pathloss value based on DL RS or DMRS (Demodulation Reference Signal) measured or received in DL symbols and/or DL slots.

The transmitting device may receive a PDCCH 0 delivering or including a SL grant 0, wherein the SL grant 0 may indicate resources of PSSCH 1~6. Note that PSSCH 1~6 may be in different SL slots. PSSCH 1~6 may be in different frequency resources. PSSCH 1~6 may be with the same size of occupied subchannel(s), but with different starting subchannel index. In one embodiment, PSSCH 1~6 may carry a first same TB.

The transmitting device may receive a PDCCH 1 delivering or including a SL grant 1, wherein the SL grant 1 may indicate resources of PSSCH 11~15. PSSCH 11~15 may be in different frequency resources. PSSCH 11~15 may be with the same size of occupied subchannel(s), but with different starting subchannel index. In one embodiment, PSSCH 11~15 may carry a second same TB.

In one embodiment, the transmitting device may derive a DL pathloss value DL_PL 1 for determining or deriving a transmit power $P_{PSSCH1}$ of PSSCH 1. The transmit power $P_{PSSCH2}$~$P_{PSSCH6}$ of PSSCH 2~6 is set as the same as $P_{PSSCH1}$. In one embodiment, DL_PL 1 may be derived based on DMRS of PDCCH 0. Alternatively, DL_PL 1 may be derived based on a DL RS or DMRS associated with a CORESET, wherein the transmitting device receives PDCCH 0 in the CORESET. Alternatively, DL_PL 1 may be derived based on a DL RS or DMRS associated with a specific CORESET.

Moreover, the transmitting device may derive a DL pathloss value DL_PL 2 for determining or deriving a transmit power $P_{PSSCH11}$ of the PSSCH 11. The transmit power $P_{PSSCH12}$~$P_{PSSCH15}$ of PSSCH 12~15 is set as the same as $P_{PSSCH11}$. In one embodiment, DL_PL 2 may be derived based on DMRS of PDCCH 1. Alternatively, DL_PL 2 may be derived based on a DL RS or DMRS associated with a CORESET, wherein the transmitting device receives PDCCH 1 in the CORESET. Alternatively, DL_PL 2 may be derived based on a DL RS or DMRS associated with a specific CORESET.

In one embodiment, the transmitting device may receive PDCCH 0 and PDCCH 1 in different CORESETs. Alternatively, the transmitting device may receive PDCCH 0 and PDCCH 1 in the same CORESET.

In one embodiment, the transmit power $P_{PSSCH1}$ and the transmit power $P_{PSSCH11}$ are determined or derived respectively. The transmit power $P_{PSSCH1}$ may be different from the transmit power $P_{PSSCH11}$.

In one embodiment, the transmitting device may derive DL pathloss value separately for each of PSSCH 1~6. The transmitting device may determine or derive the sidelink transmit power of PSSCH based on the last or newest DL pathloss value, which is utilized for determining the sidelink transmit power. As shown in the instance, the transmitting device may derive a DL pathloss value DL_PL 1 before PSSCH 1, and utilize DL_PL 1 for determining or deriving a transmit power $P_{PSSCH1}$ of PSSCH 1. Since the transmitting device may not derive another new DL pathloss value before PSSCH 2, the transmitting device may utilize DL_PL 1 for determining or deriving a transmit power $P_{PSSCH2}$ of PSSCH 2.

When the transmitting device derives a DL pathloss value DL_PL 2, the transmitting device utilizes DL_PL 2 for determining or deriving a transmit power $P_{PSSCH3}$ and the transmit power $P_{PSSCH11}$, $P_{PSSCH12}$. When the transmitting device derives a DL pathloss value DL_PL 3, the transmitting device may utilize DL_PL 3 for determining or deriving a transmit power $P_{PSSCH4}$ and the transmit power $P_{PSSCH13}$ since DL_PL 3 is the last or newest DL pathloss value for PSSCH 4 and PSSCH 13.

When the transmitting device derives a DL pathloss value DL_PL 4, the transmitting device may utilize DL_PL 4 for determining or deriving a transmit power $P_{PSSCH5}$ and the transmit power $P_{PSSCH14}$ since DL_PL 4 is the last or newest DL pathloss value for PSSCH 5 and PSSCH 14.

When the transmitting device derives a DL pathloss value DL_PL 5, the transmitting device may utilize DL_PL 5 for determining or deriving a transmit power $P_{PSSCH6}$ since DL_PL 5 is the last or newest DL pathloss value for PSSCH 6.

When the transmitting device derives a DL pathloss value DL_PL 6, the transmitting device may utilize DL_PL 6 for determining or deriving a transmit power $P_{PSSCH15}$ since DL_PL 6 is the last or newest DL pathloss value for PSSCH 15.

In one embodiment, DL_PL 1~6 may be derived based on a DL RS or DMRS associated with a specific CORESET. Any of DL_PL 1~6 derived based on DL RS or DMRS associated with the specific CORESET can be utilized for determining or deriving the transmit power $P_{PSSCH1}$~$P_{PSSCH6}$ and $P_{PSSCH11}$~$P_{PSSCH15}$.

In one embodiment, the transmitting device may receive PDCCH 0 and PDCCH 1 in the same CORESET. Alternatively, DL_PL 1~6 may be derived based on DL RS or DMRS associated with the same CORESET. Any of DL_PL 1~6 derived based on DL RS or DMRS associated with the same CORESET can be utilized for determining or deriving the transmit power $P_{PSSCH1}$~$P_{PSSCH6}$ and $P_{PSSCH11}$~$P_{PSSCH15}$.

Alternatively, the transmitting device may receive PDCCH 0 and PDCCH 1 in the different CORESETs. DL_PL 1~6 may be derived based on DL RS or DMRS associated with the different CORESETs. Any of DL_PL 1~6 derived based on DL RS or DMRS associated with the different CORESET can be utilized for determining or deriving the transmit power $P_{PSSCH1}$~$P_{PSSCH6}$ and $P_{PSSCH11}$~$P_{PSSCH15}$.

Alternatively, the transmitting device may receive PDCCH 0 and PDCCH 1 in the different CORESETs. If the transmitting device receives PDCCH 0 in CORESET 0, any of DL_PL 1~6 derived based on DL RS or DMRS associated with the CORESET 0 can be utilized for determining or deriving the transmit power $P_{PSSCH1}$~$P_{PSSCH6}$, instead of $P_{PSSCH11}$~$P_{PSSCH15}$. If the transmitting device receives PDCCH 1 in CORESET 1, any of DL_PL 1~6 derived based on DL RS or DMRS associated with the CORESET 1 can be utilized for determining or deriving the transmit power $P_{PSSCH11}$~$P_{PSSCH15}$, instead of $P_{PSSCH1}$~$P_{PSSCH6}$.

In one embodiment, the transmitting device may derive a DL pathloss value DL_PL 1 for determining or deriving a transmit power $P_{PSSCH1}$ of PSSCH 1. Since PSSCH 2 is blind retransmission of PSSCH 1, the transmit power $P_{PSSCH2}$ of PSSCH 2 may be set as the same as $P_{PSSCH1}$. In one embodiment, DL_PL 1 may be derived based on DMRS of PDCCH 0. Alternatively, DL_PL 1 may be derived based on a DL RS or DMRS associated with a CORESET, wherein the transmitting device receives PDCCH 0 in the CORESET. Alternatively, DL_PL 1 may be derived based on a DL RS or DMRS associated with a specific CORESET.

The transmitting device may receive a HARQ feedback, associated with PSSCH 1 and PSSCH 2, from PSFCH 1. If the HARQ feedback is NACK or DTX, the transmitting device may determine to perform HARQ-based sidelink retransmission, i.e. PSSCH 3 and PSSCH 4. The transmitting device may re-determine or re-derive a DL pathloss value DL_PL 2 for determining or deriving the transmit power $P_{PSSCH3}$, and set $P_{PSSCH4}$ as the same as $P_{PSSCH3}$. In one embodiment, DL_PL 2 may be the last or newest DL pathloss value for PSSCH 3. DL_PL 2 may be derived based on a DL RS or DMRS associated with the CORESET, wherein the transmitting device receives the PDCCH 0 in the CORESET. Alternatively, DL_PL 2 may be derived based on a DL RS or DMRS associated with a specific CORESET.

The transmitting device may receive another HARQ feedback, associated with the PSSCH 1~4, from PSFCH 2. If another HARQ feedback is NACK or DTX, the transmitting device may determine to perform HARQ-based sidelink retransmission, i.e. PSSCH 5 and PSSCH 6. The transmitting device may re-determine or re-derive a DL pathloss value DL_PL 4 for determining or deriving the transmit power $P_{PSSCH5}$, and set the $P_{PSSCH6}$ as the same as $P_{PSSCH5}$. In one embodiment, DL_PL 4 may be the last or newest DL pathloss value for PSSCH 5. DL_PL 4 may be derived based on a DL RS or DMRS associated with the CORESET, wherein the transmitting device receives PDCCH 0 in the CORESET. Alternatively, DL_PL 4 may be derived based on a DL RS or DMRS associated with a specific CORESET.

The transmitting device may derive a DL pathloss value DL_PL 2 for determining or deriving a transmit power $P_{PSSCH11}$ of the PSSCH 11. Since PSSCH 12 is blind retransmission of the PSSCH 11, the transmit power $P_{PSSCH12}$ of PSSCH 12 may be set as the same as $P_{PSSCH11}$. DL_PL 2 may be derived based on DMRS of the PDCCH 1. Alternatively, DL_PL 2 may be derived based on a DL RS or DMRS associated with a CORESET, wherein the transmitting device receives PDCCH 1 in the CORESET. Alternatively, DL_PL 2 may be derived based on a DL RS or DMRS associated with a specific CORESET.

The transmitting device may receive a HARQ feedback, associated with PSSCH 11 and PSSCH 12, from PSFCH 11. If the HARQ feedback is NACK or DTX, the transmitting device may determine to perform HARQ-based sidelink retransmission, i.e. PSSCH 13 and PSSCH 14. The transmitting device may re-determine or re-derive a DL pathloss value DL_PL 3 for determining or deriving the transmit power $P_{PSSCH13}$, and set $P_{PSSCH14}$ as the same as $P_{PSSCH13}$. In one embodiment, DL_PL 3 may be the last or newest DL pathloss value for PSSCH 13. DL_PL 3 may be derived based on a DL RS or DMRS associated with the CORESET, wherein the transmitting device receives PDCCH 1 in the CORESET. Alternatively, DL_PL 3 may be derived based on a DL RS or DMRS associated with a specific CORESET.

The transmitting device may receive another HARQ feedback, associated with PSSCH 11~14, from PSFCH 12. If the another HARQ feedback is NACK or DTX, the transmitting device may determine to perform HARQ-based sidelink retransmission, i.e. PSSCH 15. The transmitting device may re-determine or re-derive a DL pathloss value DL_PL 6 for determining or deriving the transmit power $P_{PSSCH15}$. In one embodiment, DL_PL 6 may be the last or newest DL pathloss value for PSSCH 15. DL_PL 6 may be derived based on a DL RS or DMRS associated with the CORESET, wherein the transmitting device receives the PDCCH 1 in the CORESET. Alternatively, DL_PL 6 may be derived based on a DL RS or DMRS associated with a specific CORESET.

Method B

In general, the concept of method B is that a transmitting device may derive a DL pathloss value for determining an uplink transmit power for an uplink transmission. In one embodiment, the transmitting device may perform the uplink transmission with the uplink transmit power. The transmitting device may utilize the DL pathloss value for determining or deriving sidelink transmit power for a sidelink transmission. In other words, the DL pathloss value for determining or deriving sidelink transmit power may be associated with the DL pathloss value for determining an uplink transmit power. In one embodiment, the DL pathloss value for determining or deriving sidelink transmit power is set or aligned to the DL pathloss value for determining an uplink transmit power.

In one embodiment, the uplink transmission may mean a PUSCH transmission. The uplink transmission may mean a last or most recent PUSCH transmission before the sidelink transmission.

In one embodiment, the uplink transmission may mean a PUCCH transmission. The uplink transmission may mean a last or most recent PUCCH transmission before the sidelink transmission.

In one embodiment, the uplink transmission may mean a SRS transmission. The uplink transmission may mean a last or most recent SRS transmission before the sidelink transmission.

In one embodiment, the uplink transmission may mean a PRACH transmission. The uplink transmission may mean a last or most recent PRACH transmission before the sidelink transmission.

In one embodiment, the uplink transmission may mean a last or most recent uplink transmission, comprising any of PUSCH, PUCCH, SRS, and PRACH, before the sidelink transmission.

In one embodiment, the transmitting device may be (pre-)configured or specified with association or alignment between sidelink transmit power and uplink transmit power of which kind of uplink transmission. The transmitting device may be (pre-)configured or specified with a kind of uplink transmission, wherein DL pathloss value for determining or deriving sidelink transmit power is associated or aligned to DL pathloss value for determining uplink transmit power for the kind of uplink transmission. DL pathloss value for determining or deriving sidelink transmit power is not associated or not aligned to DL pathloss value for determining uplink transmit power for a uplink transmission other than the kind of uplink transmission. The kind of uplink transmission may comprise any of PUSCH, PUCCH, SRS, and PRACH. Alternatively, the kind of uplink transmission may comprise any of DCI format 0_0-based PUSCH, DCI format 0_1-based PUSCH, dynamic PUSCH, type-1 configured PUSCH, type-2 configured PUSCH, PUCCH format 0~4, aperiodic SRS, periodic SRS, contention-based PRACH, contention-free PRACH, and/or PDCCH order triggered PRACH.

In one embodiment, the DL pathloss value may be calculated by L1-RSRP. Alternatively, the DL pathloss value may be calculated by higher layer filtered -RSRP. The RSRP may be any of SS-RSRP, CSI-RSRP, or DMRS-RSRP.

In one embodiment, the transmitting device may be configured with network scheduling mode, such as NR mode 1, for sidelink transmission. The transmitting device may be configured with a mixed mode supporting network scheduling mode and/or device self-determination mode, such as NR mode 1 and/or mode 2, for sidelink transmission. Alternatively, the transmitting device may be configured with device self-determination mode, such as NR mode 2, for sidelink transmission.

The transmitting device may perform one or multiple sidelink transmission(s) on one or multiple sidelink resources, such as given by the grant or selected by the transmitting device. The sidelink transmit power of the one or multiple sidelink transmission(s) is determined or derived based on the DL pathloss value. A power value derived based on the DL pathloss value may be an upper bound of sidelink transmit power of the one or multiple sidelink transmission(s).

Figure 10:
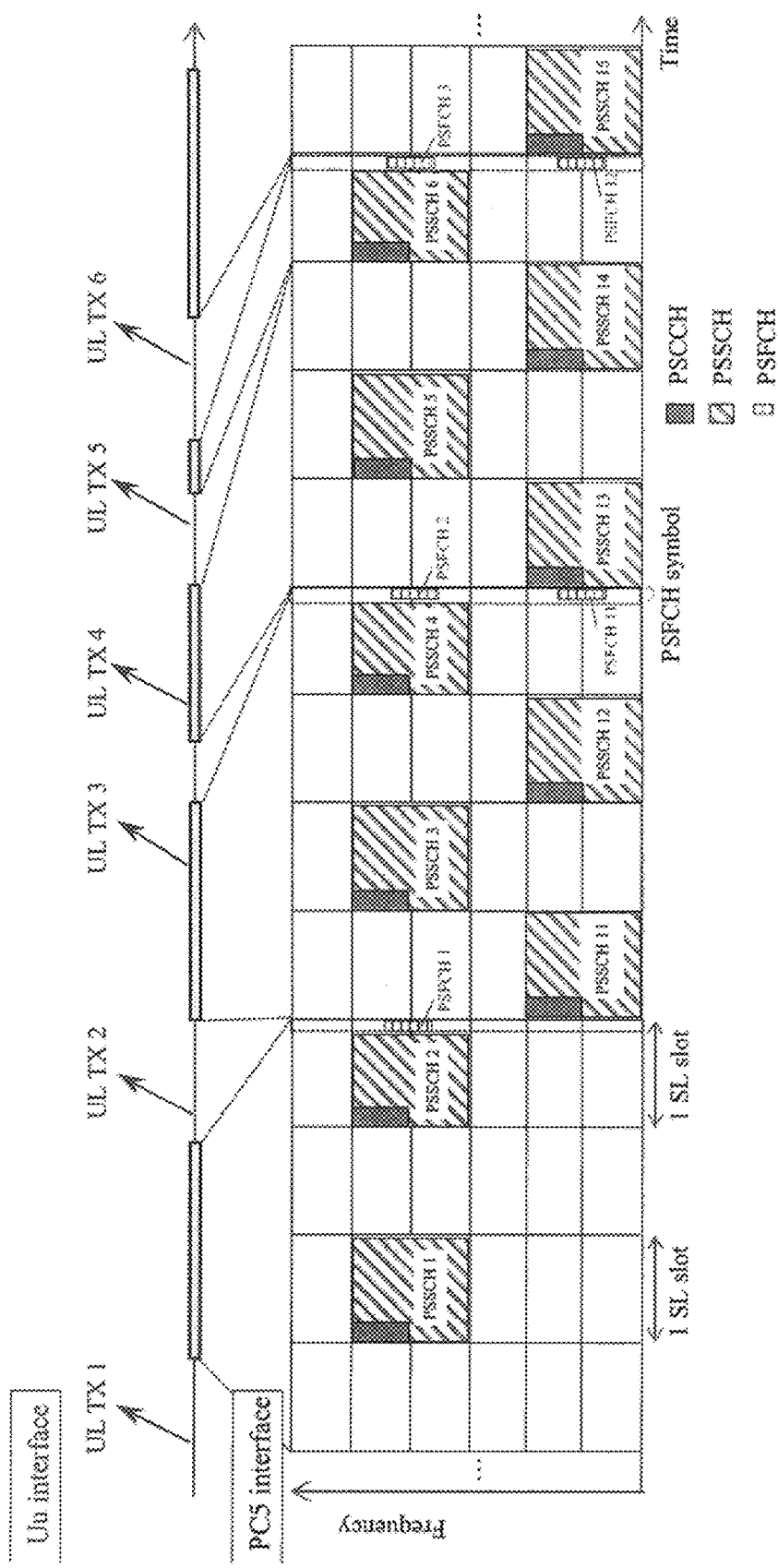
FIG. 10 is a diagram according to one exemplary embodiment.

FIG. 10 shows multiple possible embodiments. For a sidelink resource pool, the sidelink resources in time domain may occupy a subset of slots utilized for sidelink, i.e. sidelink slots. Within a slot, all the symbols or only a subset of consecutive symbols may be available for sidelink. Moreover, within the sidelink slots associated with the resource pool, PSFCH resources can be (pre)configured periodically with a period of N sidelink slot(s). N is assumed to be 4 in FIG. 10.

The transmitting device may perform UL transmissions in UL symbols and/or UL slots. The transmitting device may derive DL pathloss values for determining uplink transmit power for the UL transmissions.

The transmitting device may receive a PDCCH 0 delivering or including a SL grant 0, wherein the SL grant 0 may indicate resources of PSSCH 1~6. Note that PSSCH 1~6 may be in different SL slots. PSSCH 1~6 may be in different frequency resources. PSSCH 1~6 may be with the same size of occupied subchannel(s), but with different starting subchannel index. In one embodiment, PSSCH 1~6 may carry a first same TB.

The transmitting device may receive a PDCCH 1 delivering or including a SL grant 1, wherein the SL grant 1 may indicate resources of PSSCH 11~15. PSSCH 11~15 may be in different frequency resources. PSSCH 11~15 may be with the same size of occupied subchannel(s), but with different starting subchannel index. In one embodiment, PSSCH 11~15 may carry a second same TB.

In one embodiment, the transmitting device may derive a DL pathloss value DL_PL 1 for determining or deriving a transmit power $P_{PSSCH1}$ of the PSSCH 1. The transmit power $P_{PSSCH2}$~$P_{PSSCH6}$ of the PSSCH 2~6 is set as the same as $P_{PSSCH1}$. In one embodiment, DL_PL 1 may be associated, aligned, or set to a downlink pathloss value for determining uplink transmit power for UL TX 1. UL TX 1 may be the last or most recent UL transmission before PSSCH 1.

Moreover, the transmitting device may derive a DL pathloss value DL_PL 2 for determining or deriving a transmit power $P_{PSSCH11}$ of PSSCH 11. The transmit power $P_{PSSCH12}$~$P_{PSSCH15}$ of PSSCH 12~15 is set as the same as $P_{PSSCH11}$. In one embodiment, DL_PL 2 may be associated, aligned, or set to a downlink pathloss value for determining uplink transmit power for UL TX 2. UL TX 2 may be the last or most recent UL transmission before PSSCH 11.

In one embodiment, the transmit power $P_{PSSCH1}$ and the transmit power $P_{PSSCH11}$ may be determined or derived respectively. The transmit power $P_{PSSCH1}$ may be different from the transmit power $P_{PSSCH11}$.

In one embodiment, the transmitting device may derive DL pathloss value separately for each of PSSCH 1~6. The transmitting device may determine or derive the sidelink transmit power of PSSCH based on the last or newest DL pathloss value, which is utilized for determining the sidelink transmit power. As shown in the instance, the transmitting device may derive a DL pathloss value DL_PL 1 before PSSCH 1, and utilize DL_PL 1 for determining or deriving a transmit power $P_{PSSCH1}$ of PSSCH 1. UL TX 1 may be the last or most recent UL transmission before PSSCH 1.

Since the transmitting device may not derive another new DL pathloss value before PSSCH 2, the transmitting device may utilize DL_PL 1 for determining or deriving a transmit power $P_{PSSCH2}$ of PSSCH 2. When the transmitting device derives a DL pathloss value DL_PL 2, the transmitting device utilizes DL_PL 2 for determining or deriving a transmit power $P_{PSSCH3}$ and the transmit power $P_{PSSCH11}$, $P_{PSSCH12}$. UL TX 2 may be the last or most recent UL transmission before PSSCH 3, PSSCH 11, and PSSCH 12.

When the transmitting device derives a DL pathloss value DL_PL 3, the transmitting device may utilize DL_PL 3 for determining or deriving a transmit power $P_{PSSCH4}$ and the transmit power $P_{PSSCH13}$ since DL_PL 3 is the last or newest DL pathloss value for PSSCH 4 and PSSCH 13.

When the transmitting device derives a DL pathloss value DL_PL 4, the transmitting device may utilize DL_PL 4 for determining or deriving a transmit power $P_{PSSCH5}$ and the transmit power $P_{PSSCH14}$ since DL_PL 4 is the last or newest DL pathloss value for PSSCH 5 and PSSCH 14.

When the transmitting device derives a DL pathloss value DL_PL 5, the transmitting device may utilize DL_PL 5 for determining or deriving a transmit power $P_{PSSCH6}$ since DL_PL 5 is the last or newest DL pathloss value for PSSCH 6.

When the transmitting device derives a DL pathloss value DL_PL 6, the transmitting device may utilize DL_PL 6 for determining or deriving a transmit power $P_{PSSCH15}$ since DL_PL 6 is the last or newest DL pathloss value for PSSCH 15.

In one embodiment, DL_PL 1~6 may be associated, aligned, or set to downlink pathloss value for determining uplink transmit power for UL TX 1~6 respectively.

In one embodiment, the transmitting device may derive a DL pathloss value DL_PL 1 for determining or deriving a transmit power $P_{PSSCH1}$ of PSSCH 1. Since PSSCH 2 is blind retransmission of the PSSCH 1, the transmit power $P_{PSSCH2}$ of PSSCH 2 may be set to be the same as $P_{PSSCH1}$. In one embodiment, the DL_PL 1 may be associated, aligned, or set to downlink pathloss value for determining uplink transmit power for UL TX 1. The UL TX 1 may be the last or most recent UL transmission before the PSSCH 1.

The transmitting device may receive a HARQ feedback, associated with the PSSCH 1 and the PSSCH 2, from PSFCH 1. If the HARQ feedback is NACK or DTX, the transmitting device may determine to perform HARQ-based sidelink retransmission, i.e. PSSCH 3 and PSSCH 4. The transmitting device may re-determine or re-derive a DL pathloss value DL_PL 2 for determining or deriving the transmit power $P_{PSSCH3}$, and set the $P_{PSSCH4}$ as the same as $P_{PSSCH3}$. The DL_PL 2 may be associated, aligned, or set to downlink pathloss value for determining uplink transmit power for UL TX 2 since UL TX 2 is the last or most recent UL transmission before the PSSCH 3.

The transmitting device may receive another HARQ feedback, associated with the PSSCH 1~4, from PSFCH 2. If the another HARQ feedback is NACK or DTX, the transmitting device may determine to perform HARQ-based sidelink retransmission, i.e. PSSCH 5 and PSSCH 6. The transmitting device may re-determine or re-derive a DL pathloss value DL_PL 4 for determining or deriving the transmit power $P_{PSSCH5}$, and set $P_{PSSCH6}$ as the same as $P_{PSSCH5}$. In one embodiment, DL_PL 4 may be associated, aligned, or set to downlink pathloss value for determining uplink transmit power for UL TX 4, since the UL TX 4 is the last or most recent UL transmission before the PSSCH 5.

The transmitting device may derive a DL pathloss value DL_PL 2 for determining or deriving a transmit power $P_{PSSCH11}$ of PSSCH 11. Since PSSCH 12 is blind retransmission of PSSCH 11, the transmit power $P_{PSSCH12}$ of PSSCH 12 is set as the same as $P_{PSSCH11}$. In one embodiment, DL_PL 2 may be associated, aligned, or set to downlink pathloss value for determining uplink transmit power for UL TX 2, since UL TX 2 is the last or most recent UL transmission before PSSCH 11.

The transmitting device may receive a HARQ feedback, associated with PSSCH 11 and PSSCH 12, from PSFCH 11. If the HARQ feedback is NACK or DTX, the transmitting device may determine to perform HARQ-based sidelink retransmission, i.e. PSSCH 13 and PSSCH 14. The transmitting device may re-determine or re-derive a DL pathloss value DL_PL 3 for determining or deriving the transmit power $P_{PSSCH13}$, and set $P_{PSSCH14}$ as the same as $P_{PSSCH13}$. In one embodiment, DL_PL 3 may be associated, aligned, or set to downlink pathloss value for determining uplink transmit power for UL TX 3, since UL TX 3 is the last or most recent UL transmission before PSSCH 13.

The transmitting device may receive another HARQ feedback, associated with PSSCH 11~14, from PSFCH 12. If the another HARQ feedback is NACK or DTX, the transmitting device may determine to perform HARQ-based sidelink retransmission, i.e. PSSCH 15. The transmitting device may re-determine or re-derive a DL pathloss value DL_PL 6 for determining or deriving the transmit power $P_{PSSCH15}$. In one embodiment, DL_PL 6 may be the last or newest DL pathloss value for PSSCH 15 since DL_PL 6 is associated, aligned, or set to downlink pathloss value for determining uplink transmit power for UL TX 6.

Method C

The general concept of method C is that a transmitting device may be configured with one or multiple set of DL RS(s) for deriving DL pathloss value for determining/deriving sidelink transmit power. In one embodiment, the transmitting device may derive one or multiple DL pathloss values based on the one or multiple set of DL RS(s).

In one embodiment, each DL pathloss value may be derived based on reception or measurement on one set of DL RS(s) respectively. Furthermore, each DL pathloss value may be associated to one set of DL RS(s). The DL pathloss value may be calculated by higher layer filtered -RSRP. Alternatively, the DL pathloss value may be calculated by L1-RSRP.

In one embodiment, each DL pathloss value may be derived based on reception or measurement in one DL RS occasion, such as within one TTI, of one set of DL RS(s) respectively. Each DL pathloss value may be associated to one DL RS occasion, such as within one TTI, of one set of DL RS(s). The DL pathloss value may be calculated by L1-RSRP.

In one embodiment, the transmitting device may select or derive a specific DL pathloss value from the one or multiple DL pathloss values and utilize the specific DL pathloss value for determining or deriving sidelink transmit power.

In one embodiment, the specific DL pathloss value may be the smallest DL pathloss value among the one or multiple DL pathloss values. Furthermore, the specific DL pathloss value may be an average value derived from the one or multiple DL pathloss values.

In one embodiment, the specific DL pathloss value may be an average value derived from some of the one or multiple DL pathloss values. For instance, number of the some of the one or multiple DL pathloss values may be (around) X % of the number of the one or multiple DL pathloss values. X may be a (pre-)configured or specified value. Some of the one or multiple DL pathloss values may be smaller than others of the one or multiple DL pathloss values.

In one embodiment, the specific DL pathloss value may be a weighted-average value derived from the one or multiple DL pathloss values. A later DL pathloss value may be with higher weighting than an early DL pathloss value. A DL pathloss value derived in time occasion m may be with higher weighting than a DL pathloss value in time occasion m-c, wherein m is non-negative integer and c is positive integer. A DL pathloss value calculated by a type of RSRP value (such as SS-RSRP, CSI-RSRP, DMRS-RSRP, or such as L1-RSRP, higher layer filtered -RSRP) may be with higher weighting than a DL pathloss value calculated by another type of RSRP value. The weighting may be different for DL pathloss value calculated by different types of RSRP value (such as SS-RSRP, CSI-RSRP, DMRS-RSRP, or such as L1-RSRP, higher layer filtered -RSRP).

In one embodiment, for determining or deriving sidelink transmit power of a sidelink transmission, the transmitting device may select or derive the specific DL pathloss value based on the one or multiple DL pathloss values (or the one or multiple RSRP values), wherein the one or multiple DL pathloss values (or the one or multiple RSRP values) may be derived within a pathloss duration. The motivation of the pathloss duration could be to ensure the one or multiple DL pathloss values (or the one or multiple RSRP values) are valid for determining or deriving sidelink transmit power of the sidelink transmission, since an out-of-date DL pathloss cannot reflect the actual propagation pathloss between network node and the transmitting device. The time length of the pathloss duration may be (pre-)configured or specified. Moreover, if the transmitting device is with higher mobility (i.e. move with higher velocity or speed), the time length of the pathloss duration may be shorter, and vice versa.

In one embodiment, the pathloss duration may be associated with time occasion (such as a TTI) of the sidelink transmission. It could mean that if the transmitting device performs the sidelink transmission in a TTI n, the transmitting device may derive the specific DL pathloss based on DL RS reception or measurement within associated pathloss duration, such as the time duration between TTI n-b and TTI n-a, wherein both a and b are non-negative intergers and b>a. In one embodiment, a is determined based on processing capability of the device. (value of) a and/or b could be (pre-)configured. The device could derive a and/or b based on mobility of the device.

Figure 11:
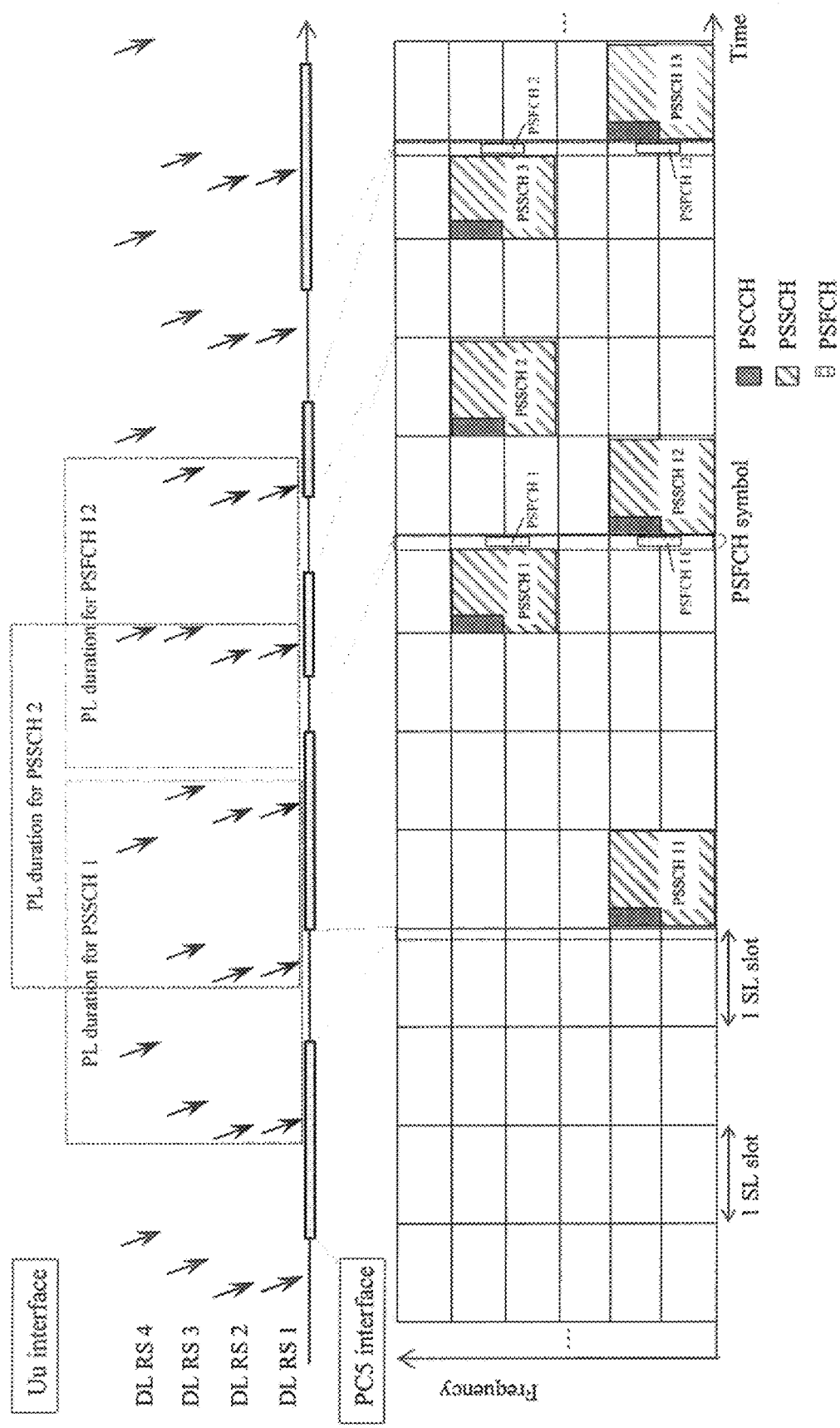
FIG. 11 is a diagram according to one exemplary embodiment.

For instance as shown in FIG. 11, the transmitting device may be configured with 4 set of DL RS(s), i.e. DL RS 1~4.

Each of the set of DL RS 1~4 may be configured with respective periodicity and/or offset for deriving the DL RS transmission timing pattern. Each of the set of DL RS 1~4 may also be configured with different periodicities and/or offsets. Furthermore, each of the set of DL RS 1~4 may be configured with different frequency resources. In addition, each of the set of DL RS 1~4 may be configured as different types of DL RS.

When the transmitting device is going to transmit PSSCH 1, the transmitting device may derive a DL pathloss value, DL_PL1, based on DL RS reception or measurement within associated PathLoss (PL) duration for PSSCH 1. In one embodiment, the transmitting device may select or derive one specific DL pathloss value, DL_PL1, based on the one or multiple DL pathloss values (or the one or multiple RSRP values), which are derived based on DL RS reception or measurement within associated PL duration for PSSCH 1. The transmitting device may receive or measure any of DL RS transmissions belonging to the set of DL RS 1~4 within associated PL duration for PSSCH 1. The transmitting device may utilize the DL_PL1 value for determining or deriving sidelink transmit power of PSSCH 1.

When the transmitting device is going to transmit PSSCH 2, the transmitting device may derive a DL pathloss value, DL_PL2, based on DL RS reception or measurement within associated PL duration for PSSCH 2. In one embodiment, the transmitting device may select or derive one specific DL pathloss value, DL_PL2, based on the one or multiple DL pathloss values (or the one or multiple RSRP values), which are derived based on DL RS reception or measurement within associated PL duration for PSSCH 2. The transmitting device may receive or measure any of DL RS transmissions belonging to the set of DL RS 1~4 within associated PL duration for PSSCH 2. The transmitting device may utilize DL_PL 2 value for determining or deriving sidelink transmit power of PSSCH 2.

When the transmitting device is going to transmit PSFCH 12 in response of receiving PSSCH 12, the transmitting device may derive a DL pathloss value, DL_PL3, based on DL RS reception or measurement within associated PL duration for PSFCH 12. In one embodiment, the transmitting device may select or derive one specific DL pathloss value, DL_PL3, based on the one or multiple DL pathloss values (or the one or multiple RSRP values), which are derived based on DL RS reception or measurement within associated PL duration for PSFCH 12. The transmitting device may receive or measure any of DL RS transmissions belonging to the set of DL RS 1~4 within associated PL duration for PSFCH 12. The transmitting device may utilize the DL_PL 3 value for determining or deriving sidelink transmit power of PSFCH 12.

In one embodiment, the pathloss duration may be (pre-)configured or specified. In one embodiment, the pathloss duration may be (pre-)configured or specified with a periodicity and/or an offset for deriving time pattern of the pathloss duration. The transmitting device may select or derive one specific DL pathloss value associated with one pathloss duration. It could mean that if the transmitting device performs the sidelink transmission in a TTI n, wherein the TTI n is within a pathloss duration N+1, the transmitting device may utilize a specific DL pathloss value associated with previous pathloss duration, such as pathloss duration N, for determining or deriving sidelink transmit power.

Figure 12:
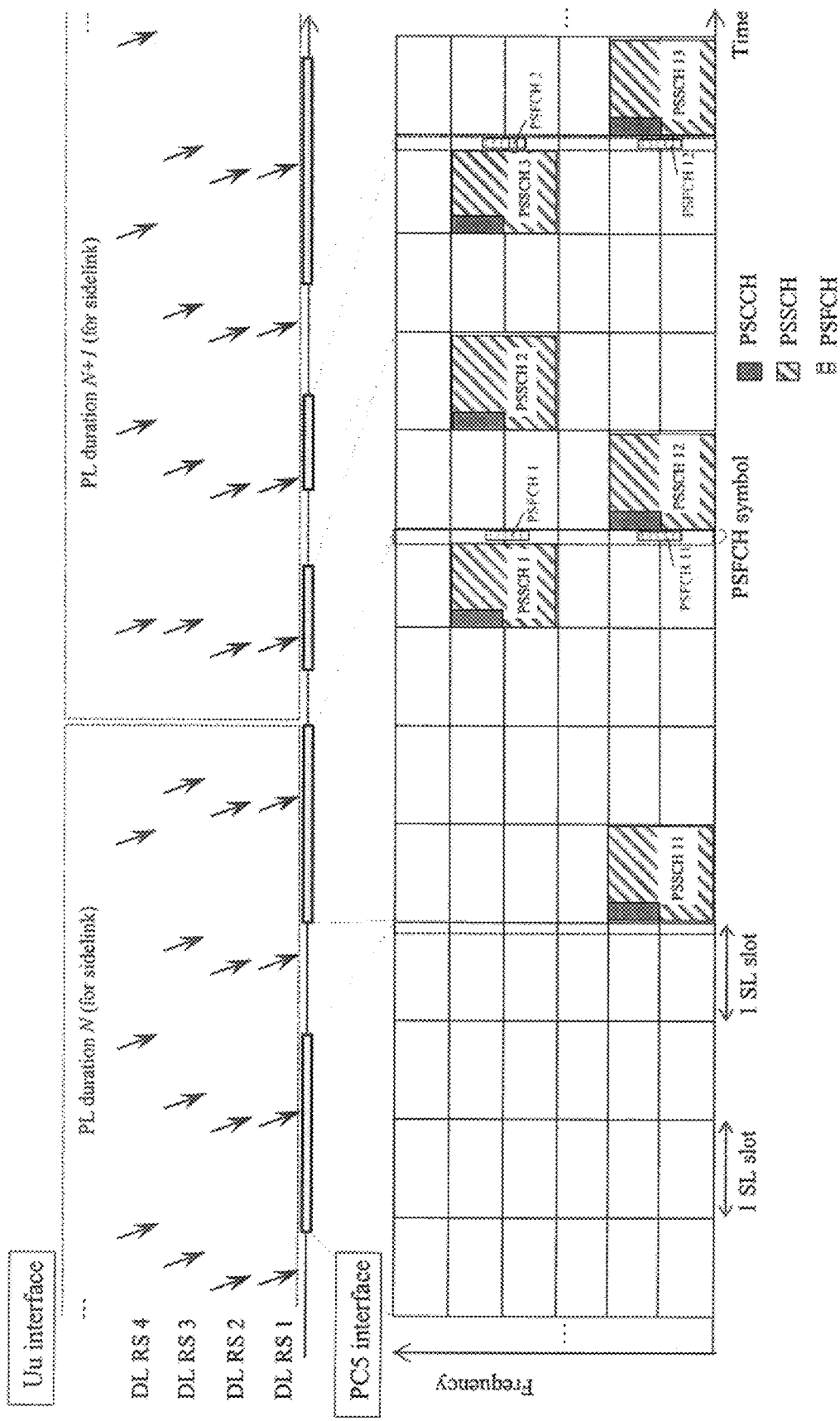
FIG. 12 is a diagram according to one exemplary embodiment.

For instance as shown in FIG. 12, the transmitting device may be configured with 4 set of DL RS(s), i.e. DL RS 1~4. Each of the set of DL RS 1~4 may be configured with respective periodicity and/or offset for deriving the DL RS transmission timing pattern. Furthermore, each of the set of DL RS 1~4 may be configured with different periodicities and/or offsets. In addition, each of the set of DL RS 1~4 may be configured with different frequency resources. Each of the set of DL RS 1~4 may also be configured as different types of DL RS.

In one embodiment, the transmitting device may derive a DL pathloss value, DL_PL N, based on DL RS reception or measurement within PL duration N. The transmitting device may derive a DL pathloss value, DL_PL (N+1), based on DL RS reception or measurement within PL duration N+1. In one embodiment, the transmitting device may select or derive one specific DL pathloss value, DL_PL N, based on the one or multiple DL pathloss values (or the one or multiple RSRP values), which are derived based on DL RS reception or measurement within PL duration N.

The transmitting device may select or derive one specific DL pathloss value, DL_PL (N+1), based on the one or multiple DL pathloss values (or the one or multiple RSRP values), which are derived based on DL RS reception or measurement within PL duration N+1. The transmitting device may receive or measure any of DL RS transmissions belonging to the set of DL RS 1~4 within PL duration N. The transmitting device may also receive or measure any of DL RS transmissions belonging to the set of DL RS 1~4 within PL duration N+1.

When the transmitting device is going to transmit PSSCH 2, the transmitting device may utilize the DL_PL N value for determining or deriving sidelink transmit power of PSSCH 2. When the transmitting device is going to transmit PSSCH 3, the transmitting device may utilize the DL_PL N value for determining or deriving sidelink transmit power of PSSCH 3. When the transmitting device is going to transmit PSFCH 12 in response of receiving PSSCH 12, the transmitting device may utilize the DL_PL N value for determining or deriving sidelink transmit power of PSFCH 12.

When the transmitting device is going to transmit PSSCH 1, the transmitting device may derive a DL pathloss value, DL_PL (N−1), based on DL RS reception or measurement within PL duration N−1. The transmitting device may select or derive one specific DL pathloss value, DL_PL (N−1), based on the one or multiple DL pathloss values (or the one or multiple RSRP values), which are derived based on DL RS reception or measurement within PL duration N−1. The transmitting device may utilize the DL_PL (N−1) value for determining or deriving sidelink transmit power of PSSCH 1. The transmitting device may utilize the DL_PL (N−1) value for determining or deriving sidelink transmit power of PSFCH 11 in response of receiving PSSCH 11.

In one embodiment, the transmitting device may be in cell coverage of a network node.

In one embodiment, the transmitting device may be in RRC-connected mode in Uu interface. The transmitting device may be configured with network scheduling mode, such as NR mode 1, for sidelink transmission. The transmitting device may be operated or configured with device self-determination mode, such as NR mode 2, for sidelink transmission. The transmitting device may be configured with a mixed mode supporting network scheduling mode and/or device self-determination mode, such as NR mode 1 and/or mode 2, for sidelink transmission.

In one embodiment, the transmitting device may receive a configuration from network node, wherein the configuration indicates the one or multiple set of DL RS(s) for deriving DL pathloss value for determining or deriving sidelink transmit power. The configuration may be a dedicate configuration for the transmitting device. The configuration may be a common configuration for the devices supporting sidelink communication. The configuration may be delivered or included in system information (for sidelink communication) or device-specific downlink data transmission.

In one embodiment, the transmitting device may be configured with one or multiple CORESETs for monitoring downlink control transmissions, wherein each CORESET may be associated with one set of DL RS(s). The transmitting device may derive one or multiple DL pathloss values (or the one or multiple RSRP values) based on the one or multiple set of DL RS(s) associated with the one or multiple CORESETs. In one embodiment, the CORESET configuration may be a dedicate configuration for the transmitting device. The CORESET configuration may also be a common configuration for the devices supporting sidelink communication. The CORESET configuration may be delivered or included in system information (for sidelink communication) or device-specific downlink data transmission.

In one embodiment, the transmitting device is in RRC-idle mode in Uu link. The transmitting device may be operated in device self-determination mode, such as NR mode 2, for sidelink transmission.

In one embodiment, the transmitting device may receive a configuration from network node, wherein the configuration indicates the one or multiple set of DL RS(s) for deriving DL pathloss value for determining or deriving sidelink transmit power. The configuration may be a common configuration for the devices supporting sidelink communication. The configuration may be delivered or included in system information (for sidelink communication).

In one embodiment, the transmitting device may be configured with one or multiple CORESETs for monitoring downlink control transmissions, wherein each CORESET may be associated with one set of DL RS(s). The transmitting device may monitor or receive the downlink control transmission for acquiring system information for sidelink communication. The transmitting device may derive one or multiple DL pathloss values (or the one or multiple RSRP values) based on the one or multiple set of DL RS(s) associated with the one or multiple CORESETs. The CORESET configuration may be a common configuration for the devices supporting sidelink communication. The CORESET configuration may be delivered or included in system information (for sidelink communication).

The DL RS may mean a SS or PBCH block or a CSI-RS. The DL RS associated with a CORESET may be SS/PBCH block, CSI-RS, or DMRS. In one embodiment, the DMRS may be utilized for demodulation of the DL control transmission in the CORESET. The RSRP may be any of SS-RSRP, CSI-RSRP, or DMRS-RSRP.

In one embodiment, the configuration of the one or multiple set of DL RS(s) may be different for a device configured with network scheduling mode, such as NR mode 1, and a device configured with device self-determination mode, such as NR mode 2. The configuration of the one or multiple set of DL RS(s) may be irrelevant to whether a device is configured with either or both of network scheduling mode and with device self-determination mode.

In one embodiment, the transmitting device configured with device self-determination mode, such as NR mode 2, may receive a configuration from network node, wherein the configuration indicates the one or multiple set of DL RS(s) for deriving DL pathloss value for determining or deriving sidelink transmit power. The transmitting device configured with network scheduling mode, such as NR mode 1, may be configured with one or multiple CORESETs for monitoring downlink control transmissions and/or sidelink grant, wherein each CORESET may be associated with one set of DL RS(s). The transmitting device configured with network scheduling mode may derive one or multiple DL pathloss (or the one or multiple RSRP values) values based on the one or multiple set of DL RS(s) associated with the one or multiple CORESETs.

In one embodiment, the transmitting device configured with network scheduling mode, such as NR mode 1, may receive a configuration from network node, wherein the configuration indicates the one or multiple set of DL RS(s) for deriving DL pathloss value for determining or deriving sidelink transmit power. The transmitting device configured with device self-determination mode, such as NR mode 2, may be configured with one or multiple CORESETs for monitoring downlink control transmissions, wherein each CORESET may be associated with one set of DL RS(s). The transmitting device configured with network scheduling mode may derive one or multiple DL pathloss values (or the one or multiple RSRP values) based on the one or multiple set of DL RS(s) associated with the one or multiple CORESETs.

In one embodiment, the configuration of the one or multiple set of DL RS(s) delivered or included in system information (for sidelink communication) may be different from the configuration of the one or multiple set of DL RS(s) delivered or included in device-specific downlink data transmission. The transmitting device may perform one or multiple sidelink transmission(s), wherein the sidelink transmit power of the one or multiple sidelink transmission(s) may be determined or derived based on the specific DL pathloss value. A power value derived based on the specific DL pathloss value may be an upper bound of sidelink transmit power of the one or multiple sidelink transmission(s).

In one embodiment, if the transmitting device does not receive or measure a DL RS occasion of one or multiple set of DL RS(s), the transmitting device may not take the DL RS occasion into consideration for DL pathloss derivation. The transmitting device may skip reception/measurement of a DL RS occasion because of any of possible reasons comprising DL bandwidth switch, SL reception or monitoring, and/or SFI indicating the DL RS occasion as non-DL.

Method D

The general concept of method D is that in one embodiment, a transmitting device may derive one or multiple DL pathloss values based on one or multiple SS or PBCH blocks with different indexes.

In one embodiment, each DL pathloss value may be derived respectively based on SS/PBCH block with one SS or PBCH block index. Each DL pathloss value may be derived respectively based on RS resource obtained from SS or PBCH block with one SS or PBCH block index. Each DL pathloss value may be associated to one SS or PBCH block index. The DL pathloss value may be calculated by higher layer filtered -RSRP. Alternatively, the DL pathloss value may be calculated by L1-RSRP.

In one embodiment, the transmitting device may select or derive a specific DL pathloss value from the one or multiple DL pathloss values and utilize the specific DL pathloss value for determining or deriving sidelink transmit power. The specific DL pathloss value may be the smallest DL pathloss value among the one or multiple DL pathloss values. The specific DL pathloss value may be an average value derived from the one or multiple DL pathloss values.

In one embodiment, the specific DL pathloss value may be an average value derived from some of the one or multiple DL pathloss values. For instance, number of the some of the one or multiple DL pathloss values may be (around) X % of the number of the one or multiple DL pathloss values. X may be a (pre-)configured or specified value. Some of the one or multiple DL pathloss values may be smaller than others of the one or multiple DL pathloss values.

In one embodiment, the specific DL pathloss value may be a weighted-average value derived from the one or multiple DL pathloss values. A later DL pathloss value may be with higher weighting than an early DL pathloss value. A DL pathloss value derived in time occasion m may be with higher weighting than a DL pathloss value in time occasion m-c, wherein m is non-negative integer and c is positive integer. A DL pathloss value calculated by a type of RSRP value (such as L1-RSRP, higher layer filtered -RSRP) may be with higher weighting than a DL pathloss value calculated by another type of RSRP value. A DL pathloss value calculated by a RSRP value based on SS or PBCH block, from that the transmitting device obtains MIB or SIB, may be with higher weighting than a DL pathloss value calculated by a RSRP value based on SS or PBCH block, from that the transmitting device does not obtain MIB or SIB.

In one embodiment a transmitting device may derive one or multiple RSRP values based on one or multiple SS or PBCH blocks with different indexes. Each RSRP value may be derived respectively based on SS or PBCH block with one SS or PBCH block index. Each RSRP value may be derived respectively based on RS resource obtained from SS or PBCH block with one SS or PBCH block index. Each RSRP value may be associated to one SS or PBCH block index. The RSRP may be higher layer filtered -RSRP. Preferably or alternatively, the RSRP may be L1-RSRP.

In one embodiment, the transmitting device may select or derive a specific DL pathloss value from the one or multiple RSRP values and utilize the specific DL pathloss value for determining or deriving sidelink transmit power. The specific DL pathloss value may be derived based on the smallest RSRP value among the one or multiple RSRP values. The specific DL pathloss value may be derived based on an average RSRP value derived from the one or multiple RSRP values.

In one embodiment, the specific DL pathloss value may be derived based on an average RSRP value derived from some of the one or multiple RSRP values. For instance, number of the some of the one or multiple RSRP values may be (around) X % of the number of the one or multiple RSRP values. X may be a (pre-)configured or specified value. Some of the one or multiple RSRP values may be smaller than others of the one or multiple RSRP values.

In one embodiment, the specific DL pathloss value may be derived based on a weighted-average RSRP value derived from the one or multiple RSRP values. A later RSRP value may be with higher weighting than an early RSRP value. A RSRP value derived in time occasion m may be with higher weighting than a RSRP value in time occasion m-c, wherein m is non-negative integer and c is positive integer. A type of RSRP value (such as L1-RSRP, higher layer filtered -RSRP) may be with higher weighting than another type of RSRP value. A RSRP value based on SS or PBCH block, from that the transmitting device obtains MIB or SIB, may be with higher weighting than a RSRP value based on SS or PBCH block, from that the transmitting device does not obtain MIB or SIB.

In one embodiment, the transmitting device may not know which SS or PBCH block resources the network really transmits SS or PBCH block, i.e. actual SS or PBCH blocks. For instance, the transmitting device is in RRC-idle mode in Uu interface or the transmitting device does not receive configuration of SS or PBCH block. The transmitting device may receive or measure each candidate SS or PBCH block. The transmitting device may derive DL pathloss value based on one or multiple candidate SS or PBCH blocks.

Alternatively, to avoid error measurement, the transmitting device may derive DL pathloss value based on one or multiple SS or PBCH blocks that the transmitting device can obtain MIB. The transmitting device may derive DL pathloss value based on RS resources obtained from one or multiple SS or PBCH blocks that the transmitting device can obtain MIB. More specifically, the MIB may be delivered or included in PBCH.

Alternatively, the transmitting device may derive DL pathloss value based on one or multiple SS or PBCH blocks that the transmitting device can obtain system information for sidelink communication. In one embodiment, the transmitting device may derive DL pathloss value based on RS resources obtained from one or multiple SS or PBCH blocks that the transmitting device can obtain system information for sidelink communication. More specifically, the SS or PBCH blocks that the transmitting device can obtain system information for sidelink communication could mean that the SS or PBCH blocks associated with reception, monitoring, or detection of a downlink control transmission, which scheduling a DL data transmission delivering the system information for sidelink communication.

In one embodiment, for determining or deriving sidelink transmit power of a sidelink transmission, the transmitting device may select or derive the specific DL pathloss value based on the one or multiple DL pathloss values (or the one or multiple RSRP values), wherein the one or multiple DL pathloss values (or the one or multiple RSRP values) may be derived within a pathloss duration. The motivation of the pathloss duration could be to ensure the one or multiple DL pathloss values (or the one or multiple RSRP values) are valid for determining or deriving sidelink transmit power of the sidelink transmission, since an out-of-date DL pathloss cannot reflect the actual propagation pathloss between network node and the transmitting device. The time length of the pathloss duration may be (pre-)configured or specified. Moreover, if the transmitting device is with higher mobility (i.e. move with higher velocity or speed), the time length of the pathloss duration may be shorter, and vice versa.

In one embodiment, the pathloss duration may be associated with time occasion of the sidelink transmission. It could mean that if the transmitting device performs the sidelink transmission in a TTI n, the transmitting device may derive the specific DL pathloss based on reception or measurement of one or multiple SS or PBCH blocks within associated pathloss duration, such as the time duration between TTI n-b and TTI n-a, wherein both a and b are non-negative integers and b>a. a could be determined based on processing capability of the device. (value of) a and/or b could be (pre-)configured. The device may derive a and/or b based on mobility of the device.

Figure 13:
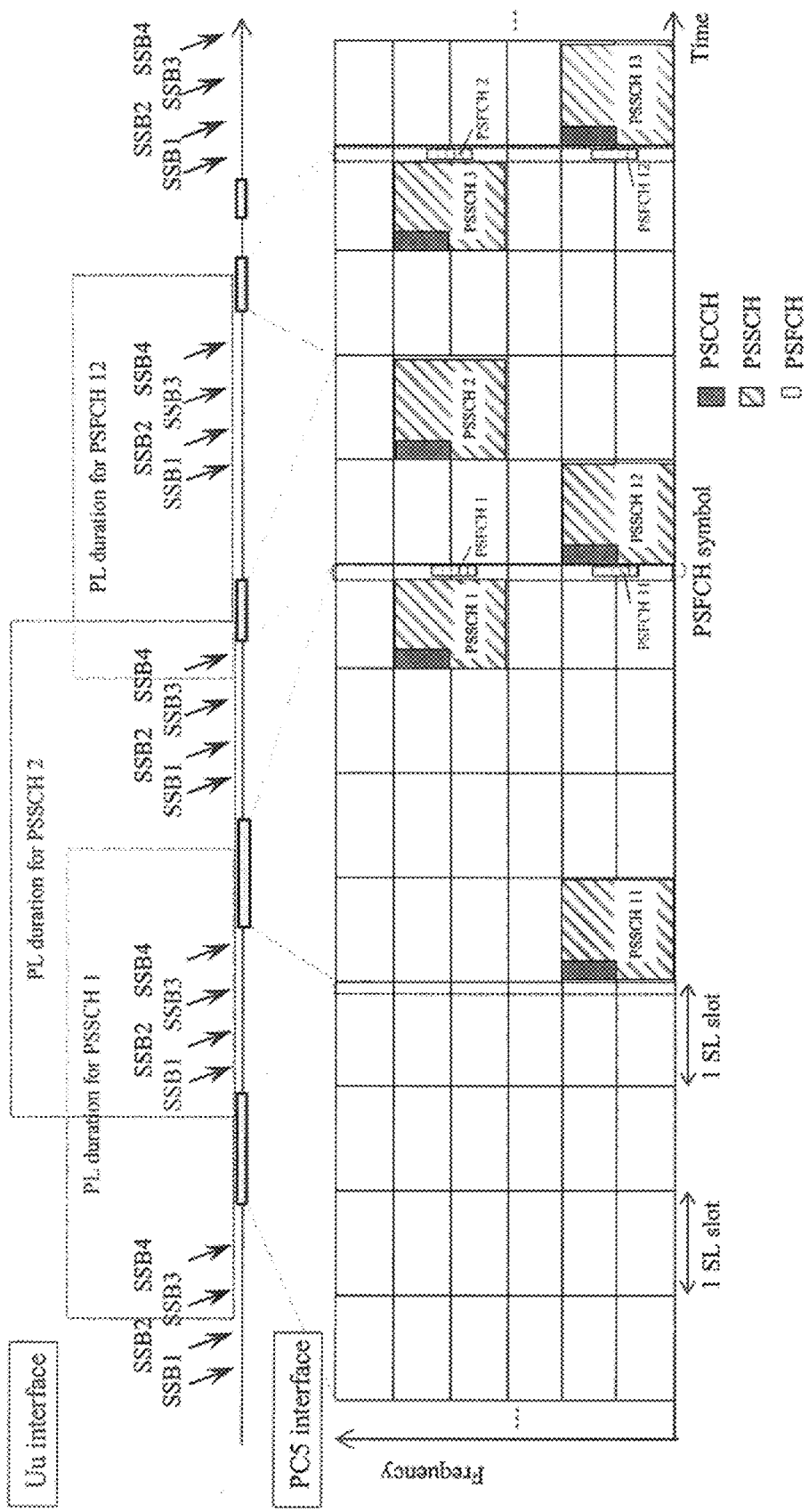
FIG. 13 is a diagram according to one exemplary embodiment.

For instance as shown in FIG. 13, the transmitting device may derive DL pathloss value based on (RS resources obtained from) SS or PBCH blocks with index 1~4, noted as SSB 1~4. In one embodiment, the transmitting device can obtain MIB from any of SS or PBCH blocks with index 1~4.

When the transmitting device is going to transmit PSSCH 1, the transmitting device may derive a DL pathloss value, DL_PL1, based on reception or measurement of SSB 1~4 within associated PathLoss (PL) duration for PSSCH 1. In one embodiment, the transmitting device may select or derive one specific DL pathloss value, DL_PL1, based on the one or multiple DL pathloss values (or the one or multiple RSRP values), which are derived based on reception or measurement of SSB 1~4 within associated PL duration for PSSCH 1. The transmitting device may receive or measure any of SSB transmission belonging to SSB 1~4 within associated PL duration for PSSCH 1. The transmitting device may utilize the DL_PL1 value for determining or deriving sidelink transmit power of PSSCH 1.

When the transmitting device is going to transmit PSSCH 2, the transmitting device may derive a DL pathloss value, DL_PL2, based on reception or measurement of SSB 1~4 within associated PL duration for PSSCH 2. In one embodiment, the transmitting device may select or derive one specific DL pathloss value, DL_PL2, based on the one or multiple DL pathloss values (or the one or multiple RSRP values), which are derived based on reception or measurement of SSB 1~4 within associated PL duration for PSSCH 2. The transmitting device may receive or measure any of SSB transmission belonging to SSB 1~4 within associated PL duration for PSSCH 2. The transmitting device may utilize the DL_PL 2 value for determining or deriving sidelink transmit power of PSSCH 2.

When the transmitting device is going to transmit PSFCH 12 in response of receiving PSSCH 12, the transmitting device may derive a DL pathloss value, DL_PL3, based on reception/measurement of SSB 1~4 within associated PL duration for PSFCH 12. The transmitting device may select or derive one specific DL pathloss value, DL_PL3, based on the one or multiple DL pathloss values (or the one or multiple RSRP values), which are derived based on reception or measurement of SSB 1~4 within associated PL duration for PSFCH 12. The transmitting device may receive or measure any of SSB transmissions belonging to SSB 1~4 within associated PL duration for PSFCH 12. The transmitting device may utilize the DL_PL 3 value for determining or deriving sidelink transmit power of PSFCH 12.

In one embodiment, the pathloss duration may be (pre-)configured or specified. Preferably, the pathloss duration may be configured with a periodicity and/or an offset for deriving time pattern of the pathloss duration. The transmitting device may select or derive one specific DL pathloss value associated with one pathloss duration. It could mean that if the transmitting device performs the sidelink transmission in a TTI n, wherein the TTI n is within a pathloss duration N+1, the transmitting device may utilize a specific DL pathloss value associated with previous pathloss duration, such as pathloss duration N, for determining or deriving sidelink transmit power.

Figure 14:
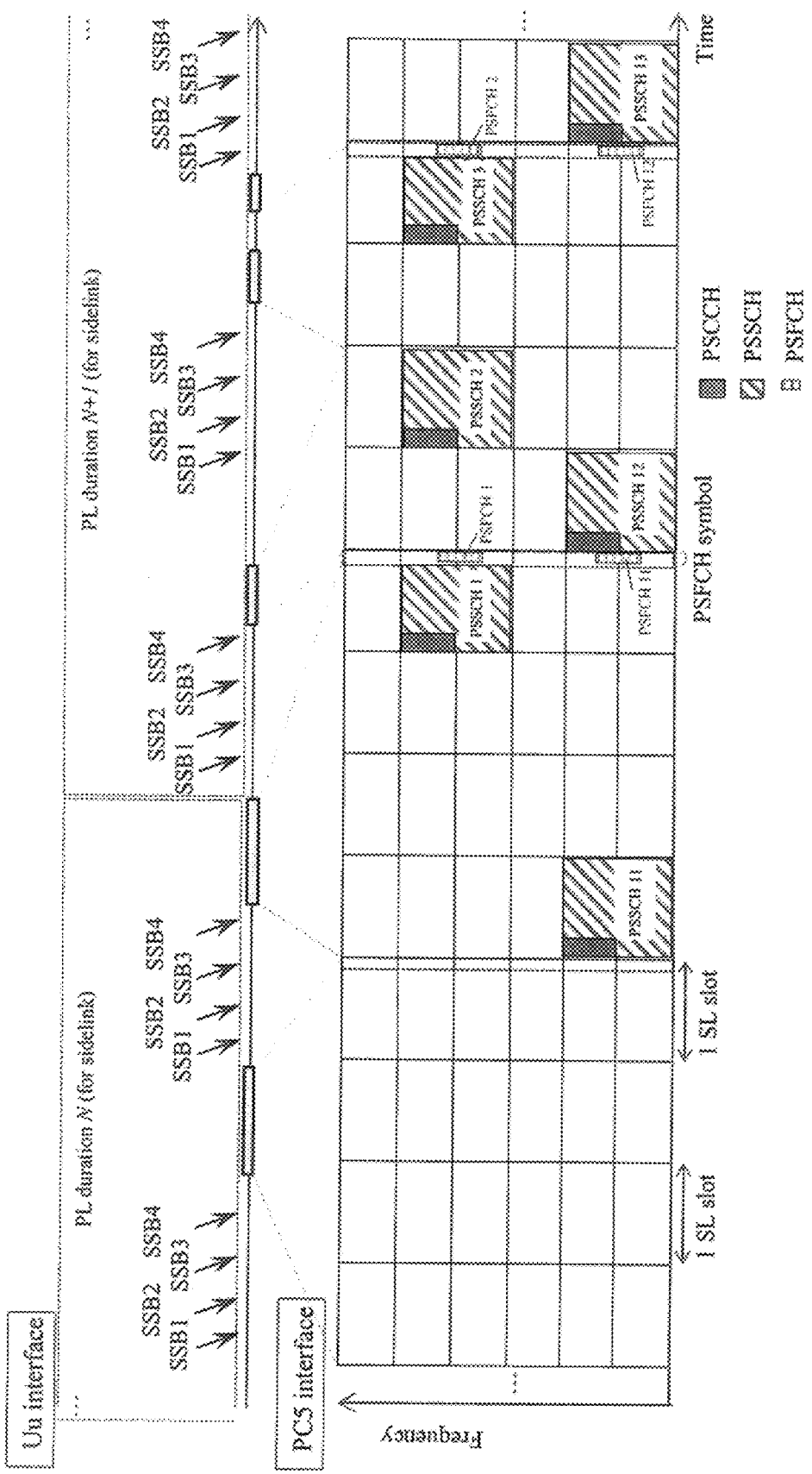
FIG. 14 is a diagram according to one exemplary embodiment.

For instance as shown in FIG. 14, the transmitting device may derive DL pathloss value based on (RS resources obtained from) SS or PBCH blocks with index 1~4, noted as SSB 1~4. In one embodiment, the transmitting device can obtain MIB from any of SS or PBCH blocks with index 1~4.

In one embodiment, the transmitting device may derive a DL pathloss value, DL_PL N, based on reception or measurement of SSB 1~4 within PL duration N. The transmitting device may derive a DL pathloss value, DL_PL (N+1), based on reception or measurement of SSB 1~4 within PL duration N+1. The transmitting device may select or derive one specific DL pathloss value, DL_PL N, based on the one or multiple DL pathloss values (or the one or multiple RSRP values), which are derived based on reception or measurement of SSB 1~4 within PL duration N. The transmitting device may select or derive one specific DL pathloss value, DL_PL (N+1), based on the one or multiple DL pathloss values (or the one or multiple RSRP values), which are derived based on reception or measurement of SSB 1~4 within PL duration N+1.

In one embodiment, the transmitting device may receive or measure any of SSB transmissions belonging to SSB 1~4 within PL duration N. The transmitting device may receive or measure any of SSB transmissions belonging to the set of SSB 1~4 within PL duration N+1.

When the transmitting device is going to transmit PSSCH 2, the transmitting device may utilize the DL_PL N value for determining or deriving sidelink transmit power of PSSCH 2. When the transmitting device is going to transmit PSSCH 3, the transmitting device may utilize the DL_PL N value for determining or deriving sidelink transmit power of PSSCH 3. When the transmitting device is going to transmit PSFCH 12 in response of receiving PSSCH 12, the transmitting device may utilize the DL_PL N value for determining or deriving sidelink transmit power of PSFCH 12.

When the transmitting device is going to transmit PSSCH 1, the transmitting device may derive a DL pathloss value, DL_PL (N−1), based on reception or measurement of SSB 1~4 within PL duration N−1. In one embodiment, the transmitting device may select or derive one specific DL pathloss value, DL_PL (N−1), based on the one or multiple DL pathloss values (or the one or multiple RSRP values), which are derived based on reception or measurement of SSB 1~4 within PL duration N−1. The transmitting device may utilize the DL_PL (N−1) value for determining or deriving sidelink transmit power of PSSCH 1. The transmitting device may utilize the DL_PL (N−1) value for determining or deriving sidelink transmit power of PSFCH 11 in response of receiving PSSCH 11.

In one embodiment, the transmitting device may be in cell coverage of a network node.

In one embodiment, the transmitting device may be in RRC-connected mode in Uu interface. The transmitting device may be configured with network scheduling mode, such as NR mode 1, for sidelink transmission. The transmitting device may be operated or configured with device self-determination mode, such as NR mode 2, for sidelink transmission. The transmitting device may be configured with a mixed mode supporting network scheduling mode and/or device self-determination mode, such as NR mode 1 and/or mode 2, for sidelink transmission.

In one embodiment, the transmitting device may receive a configuration from network node, wherein the configuration indicates actual SS or PBCH blocks for deriving DL pathloss value for determining or deriving sidelink transmit power. The configuration may be a dedicate configuration for the transmitting device. The configuration may be a common configuration for the devices supporting sidelink communication. The configuration may be delivered or included in system information (for sidelink communication) or device-specific downlink data transmission.

In one embodiment, the transmitting device is in RRC-idle mode in Uu link. The transmitting device may be operated in device self-determination mode, such as NR mode 2, for sidelink transmission.

In one embodiment, the transmitting device may receive a configuration from network node, wherein the configuration indicates actual SS or PBCH blocks for deriving DL pathloss value for determining or deriving sidelink transmit power. The configuration may be a common configuration for the devices supporting sidelink communication. The configuration may be delivered or included in system information (for sidelink communication).

In one embodiment, the configuration of actual SS or PBCH blocks may be different for a device configured with network scheduling mode, such as NR mode 1, and a device configured with device self-determination mode, such as NR mode 2. The RSRP may be SS-RSRP. The configuration of actual SS or PBCH blocks may be irrelevant to whether a device is configured with either or both of network scheduling mode and with device self-determination mode.

In one embodiment, the transmitting device configured with device self-determination mode, such as NR mode 2, may receive a configuration from network node, wherein the configuration indicates actual SS or PBCH blocks for deriving DL pathloss value for determining or deriving sidelink transmit power. The transmitting device configured with network scheduling mode, such as NR mode 1, may receive a configuration from network node, wherein the configuration indicates actual SS or PBCH blocks for deriving DL pathloss value for determining or deriving sidelink transmit power.

In one embodiment, the transmitting device may perform one or multiple sidelink transmission(s), wherein the sidelink transmit power of the one or multiple sidelink transmission(s) may be determined or derived based on the specific DL pathloss value. A power value derived based on the specific DL pathloss value may be an upper bound of sidelink transmit power of the one or multiple sidelink transmission(s).

In one embodiment, if the transmitting device does not receive or measure a SSB occasion of the one or multiple SS or PBCH blocks, the transmitting device may not take the SSB occasion into consideration for DL pathloss derivation. If the transmitting device does not receive MIB (successfully) from a SSB occasion of the one or multiple SS or PBCH blocks, the transmitting device may not take the SSB occasion in consideration for DL pathloss derivation. The transmitting device may skip reception or measurement of a SSB occasion because of any of possible reasons comprising DL bandwidth switch, SL reception or monitoring.

For Method C and/or Method D:

In one embodiment, the transmitting device may perform one or multiple sidelink transmission(s) for a data packet and/or a TB, wherein the one or multiple sidelink transmission(s) are transmitted with the same sidelink transmit power. The resources of the one or multiple sidelink transmission(s) may be indicated by one grant, from network node to the transmitting device. Alternatively, the resources of the one or multiple sidelink transmission(s) may be selected by the transmitting device. The sidelink transmit power of the one or multiple sidelink transmission(s) is determined or derived based on one specific DL pathloss value. The motivation could be to align or keep the same sidelink transmit power at least for delivering the same data packet and/or the same TB.

In one embodiment, the one specific DL pathloss value may be determined when the transmitting device performs the first or initial sidelink transmission among the one or multiple sidelink transmission(s). The sidelink transmit power may be determined when the transmitting device performs the first or initial sidelink transmission among the one or multiple sidelink transmission(s).

In one embodiment, the one specific DL pathloss value may be determined before the transmitting device performs the first or initial sidelink transmission among the one or multiple sidelink transmission(s). The sidelink transmit power may be determined before the transmitting device performs the first or initial sidelink transmission among the one or multiple sidelink transmission(s). In one embodiment, the sidelink transmit power of the other sidelink transmission(s) among the one or multiple sidelink transmission(s) could be set or determined as the sidelink transit power of the first or initial sidelink transmission among the one or multiple sidelink transmission(s).

Alternatively, the transmitting device may perform one or multiple sidelink transmission(s) for a data packet and/or a TB. The resources of the one or multiple sidelink transmission(s) may be indicated by one grant, from network node to the transmitting device. Alternatively, the resources of the one or multiple sidelink transmission(s) may be selected by the transmitting device.

The transmitting device may determine or derive sidelink transmit power separately or respectively for the one or multiple sidelink transmission(s). The transmitting device may also determine or derive sidelink transmit power separately or respectively for each of the one or multiple sidelink transmission(s). Furthermore, the transmitting device may determine or derive the sidelink transmit power for each of the one or multiple sidelink transmission(s) in different time occasions. Thus, the sidelink transmit power for each of the one or multiple sidelink transmission(s) may be different. Since the DL pathloss value and/or sidelink pathloss value may vary, the transmitting device may determine or derive one sidelink transmit power before the transmitting device transmits one of the one or multiple sidelink transmission(s).

Alternatively, the transmitting device may perform one or multiple sidelink transmission(s) for a data packet and/or a TB, wherein the one or multiple sidelink transmission(s) are transmitted with the same sidelink transmit power. The resources of the one or multiple sidelink transmission(s) may be indicated by one grant, from network node to the transmitting device. Alternatively, the resources of the one or multiple sidelink transmission(s) may be selected by the transmitting device. The transmitting device may re-determine or re-derive sidelink transmit power for some of the one or multiple sidelink transmission(s). The transmitting device may determine or derive a first sidelink transmit power for the first or initial sidelink transmission among the one or multiple sidelink transmission(s). The blind sidelink retransmission(s) corresponding to the first or initial sidelink transmission may be set or determined as the first sidelink transit power.

When the transmitting device receives a HARQ feedback, such as NACK or DTX, associated with the first/initial sidelink transmission and/or corresponding blind sidelink retransmission(s), the transmitting device may re-determine/re-derive a second sidelink transmit power for a HARQ-based sidelink retransmission. The blind sidelink retransmission(s) corresponding to the HARQ-based sidelink retransmission may be set or determined as the second sidelink transit power.

In one embodiment, the transmitting device may determine or derive the first sidelink transmit power and the second sidelink transmit power in different time occasions. Thus, the first or initial sidelink transmit power and the second sidelink transmit power may be different. Since the DL pathloss value and/or sidelink pathloss value may vary, the transmitting device may determine or derive the first sidelink transmit power before the transmitting device transmits the first or initial sidelink transmission, and/or the transmitting device may determine or derive the second sidelink transmit power before the transmitting device transmits the (first) HARQ-based sidelink retransmission.

Following the same mechanism, if the transmitting device receives another HARQ feedback, such as NACK or DTX, associated with the HARQ-based sidelink retransmission, first or initial sidelink transmission and/or corresponding blind sidelink retransmission(s), the transmitting device may re-determine or re-derive a third sidelink transmit power for another HARQ-based sidelink retransmission. The blind sidelink retransmission(s) corresponding to the another HARQ-based sidelink retransmission may be set or determined as the third sidelink transit power, and so on.

For all above methods, alternatives, and embodiments:

There are many alternatives for deriving DL pathloss value for determining or deriving sidelink transmit power. As an example, FIG. 15 lists a plurality of alternatives. Alternatives 1~7 shown in FIG. 15 may be similar as DL pathloss value derivation utilized for uplink power control in Uu interface. Alternatives 8~12 in FIG. 15 are new alternatives as introduced and described above in Methods A~D.

FIG. 15 also lists an example about the applicability for different SL modes. Note that the applicability may not be restricted as the example shown in FIG. 15.

In one embodiment, for a device configured with network scheduling mode, such as NR mode 1, for sidelink transmission, a part of the alternatives may be utilized for deriving DL pathloss value for sidelink power control. For instance, any of alternatives 3~12 may be utilized for deriving DL pathloss value for sidelink power control. The network node may trace the position and mobility of mode 1 devices. The network node may adjust network beams for mode 1 devices. Thus, most alternatives may be applicable for mode 1 devices, even for alternatives 3 and 8 wherein the device requires to receive or monitor dedicate downlink control transmission.

In one embodiment, for a device in RRC-connected mode and does not configured with network scheduling mode for sidelink transmission, such as the device is operated in device self-determination mode, such as NR mode 2, for sidelink transmission, a part of the alternatives may be utilized for deriving DL pathloss value for sidelink power control. For instance, any of alternatives 1, 4~7, and 9~12 may be utilized for deriving DL pathloss value for sidelink power control. For mode 2 devices, since sidelink resources are not scheduled by network via sidelink grant, the network node may not need to trace (timely and accurately) the position and mobility of mode 2 devices. Thus, the network node may not need to adjust network beams for mode 2 devices. Thus, alternatives 3 and 8, with required to receive or monitor dedicate downlink control transmission, may not be applicable for mode 2 devices.

In one embodiment, for a device in RRC-idle mode and does not configured with network scheduling mode for sidelink transmission, such as the device is operated in device self-determination mode, such as NR mode 2, for sidelink transmission, a part of the alternatives may be utilized for deriving DL pathloss value for sidelink power control. For instance, any of alternatives 1, 9, and 11~12 may be utilized for deriving DL pathloss value for sidelink power control. For RRC-idle mode device, the network node may not know the position and mobility of the RRC-idle device, and the device may not receive dedicate configuration from network. Thus, alternatives 3~8 and 10 may not be applicable for RRC-idle device.

In one embodiment, for a device configured with a mixed mode supporting network scheduling mode and/or device self-determination mode, such as NR mode 1 and/or mode 2, for sidelink transmission, a part of the alternatives may be utilized for deriving DL pathloss value for sidelink power control. For instance, any of alternatives 3~12 may be utilized for deriving DL pathloss value for sidelink power control. Since the device can operate in mode 1, the network node may trace the position and mobility of the mixed mode device. The network node may adjust network beams for the mixed mode device. Thus, most alternatives may be applicable for the mixed mode device, even for alternatives 3 and 8 wherein the device requires to receive or monitor dedicate downlink control transmission.

The applicable alternatives can be different for devices operated in different modes. In one embodiment, when a device operates in network scheduling mode, the device may apply a first alternative for deriving DL pathloss value for sidelink power control; and when the device operates in device self-determination mode, the device may apply a second alternative for deriving DL pathloss value for sidelink power control.

In one embodiment, when a device operates in network scheduling mode, the device may apply a first alternative for deriving DL pathloss value for sidelink power control; and when the device does not operate in network scheduling mode, the device may apply a second alternative for deriving DL pathloss value for sidelink power control.

In one embodiment, when a device operated in RRC-connected mode, the device may apply a first alternative for deriving DL pathloss value for sidelink power control; and when the device operated in RRC-idle mode, the device may apply a second alternative for deriving DL pathloss value for sidelink power control.

In one embodiment, for a device configured with a mixed mode, when a device operates in network scheduling mode of the mixed mode, the device may apply a first alternative for deriving DL pathloss value for sidelink power control; and when the device operates in device self-determination mode of the mixed mode, the device may apply a second alternative for deriving DL pathloss value for sidelink power control.

In one embodiment, for a device configured with a mixed mode, when a device operates in network scheduling mode of the mixed mode, the device may apply a first alternative for deriving DL pathloss value for sidelink power control; and when the device operates in device self-determination mode of the mixed mode, the device may apply the first alternative for deriving DL pathloss value for sidelink power control.

For the first alternative and the second alternative, any combination from the plurality of alternatives may be possible embodiments.

In one embodiment, the SS-RSRP may mean RSRP measured among reference signals corresponding to SS or PBCH block. The CSI-RSRP may mean RSRP measured from CSI-RS. The DMRS-RSRP may mean RSRP measured from DMRS. A time occasion may mean a TTI. A TTI may mean any of subframe, slot, sub-slot, mini-slot, or a set of symbols.

In one embodiment, a sidelink slot may mean a slot (fully or partially) comprising symbols for sidelink. A sidelink slot may also mean a transmission time interval for a sidelink (data) transmission. A sidelink slot could contain all OFDM (Orthogonal Frequency Division Multiplexing) symbols available for sidelink transmission within a slot. A sidelink slot could also contain a consecutive OFDM symbols available for sidelink transmission within a slot.

In one embodiment, when the (transmitting) device operates in device self-determination mode, such as NR mode 2, the (transmitting) device could perform sensing and resource selection. The (transmitting) device could select the sidelink resource based on sensing result. When the (transmitting) device could operate or be configured with network scheduling mode, such as NR mode 1, the (transmitting) device acquires sidelink resources based on a grant from network.

In one embodiment, the (transmitting) device could receive or measure the DL RS and could perform the sidelink transmission in the same carrier or cell. Furthermore, the (transmitting) device could receive or measure the DL RS, and could perform the sidelink transmission in the same frequency band. The DL RS and the sidelink transmission could be received or transmitted in the same carrier or cell or in the same frequency band.

In one embodiment, the (transmitting) device could receive or measure the CSI-RS, and could perform the sidelink transmission in the same carrier or cell. Furthermore, the (transmitting) device could receive or measure the CSI-RS, and could perform the sidelink transmission in the same frequency band. The CSI-RS and the sidelink transmission could be received or transmitted in the same carrier or cell or in the same frequency band.

In one embodiment, the (transmitting) device could receive or measure the SS or PBCH block, and could perform the sidelink transmission in the same carrier or cell. The (transmitting) device could receive or measure the SS or PBCH block, and could perform the sidelink transmission in the same frequency band. The SS or PBCH block and the sidelink transmission could be received or transmitted in the same carrier or cell or in the same frequency band.

In one embodiment, the (transmitting) device could receive or measure the DMRS and could perform the sidelink transmission in the same carrier or cell. Furthermore, the (transmitting) device could receive or measure the DMRS, and could perform the sidelink transmission in the same frequency band. The DMRS and the sidelink transmission could be received or transmitted in the same carrier or cell or in the same frequency band.

In one embodiment, the DL pathloss could mean the power propagation loss between network node and the (transmitting) device. The SL pathloss could mean the power propagation loss between device and device.

In one embodiment, the (transmitting) device could be configured to use DL pathloss for sidelink power control. The (transmitting) device could also be configured to use both DL pathloss and SL pathloss for sidelink power control. The minimum of the power values given by open-loop power control based on DL pathloss and the open-loop power control based on SL pathloss could be taken for sidelink transmit power.

In one embodiment, the sidelink transmission may be device-to-device transmission. Preferably, the sidelink transmission may be V2X transmission. The sidelink transmission may be P2X transmission. The sidelink transmission may be on PC5 interface.

In one embodiment, the PC5 interface or link may be wireless interface for communication between device and device, among devices, and/or between UEs. In addition, the PC5 interface or link may be wireless interface for V2X or P2X communication. The Uu interface or link may be wireless interface for communication between network node and device, or between network node and UE.

In one embodiment, the (transmitting) device may be a UE, a vehicle UE, or a V2X UE. The downlink control transmission may mean PDCCH. The grant may mean a sidelink grant delivered or included in PDCCH. The grant may also mean a DCI format, for scheduling sidelink resources, delivered or included in PDCCH.

In one embodiment, the sidelink power control may be maintained per sidelink link or connection. The sidelink power control may be maintained per sidelink group.

In one embodiment, the sidelink transmission may mean PSSCH. The sidelink transmit power may mean the transmit power of PSSCH.

In one embodiment, the sidelink transmission may mean PSCCH. The sidelink transmit power may mean the transmit power of PSCCH.

In one embodiment, the sidelink transmission may mean PSFCH. The sidelink transmit power may mean the transmit power of PSFCH.

In one embodiment, the PSSCH and PSCCH for the same sidelink link or connection may share the same (alternative for deriving) DL pathloss for sidelink power control. The PSSCH and PSCCH transmitted for the same sidelink group may share the same (alternative for deriving) DL pathloss for sidelink power control. The PSSCH, PSCCH, and PSFCH for the same sidelink link or connection may share the same (alternative for deriving) DL pathloss for sidelink power control. Furthermore, the PSSCH, PSCCH, and PSFCH transmitted for the same sidelink group may share the same (alternative for deriving) DL pathloss for sidelink power control.

In one embodiment, the sidelink transmission may be a sidelink unicast transmission, a sidelink groupcast transmission, or a sidelink broadcast transmission.

In one embodiment, transmit power control for sidelink unicast transmission may share the same DL pathloss value as transmit power control for sidelink broadcast transmission. Transmit power control for sidelink groupcast transmission may also share the same DL pathloss value as transmit power control for sidelink broadcast transmission. Furthermore, transmit power control for sidelink groupcast transmission may share the same DL pathloss value as transmit power control for sidelink unicast transmission. In addition, transmit power control for sidelink unicast, groupcast, and broadcast transmission may share the same DL pathloss value.

In one embodiment, transmit power control for sidelink unicast transmission may use different DL pathloss values from transmit power control for sidelink broadcast transmission. Transmit power control for sidelink groupcast transmission may also use different DL pathloss values from transmit power control for sidelink broadcast transmission. Furthermore, transmit power control for sidelink groupcast transmission may use different DL pathloss values from transmit power control for sidelink unicast transmission. In addition, transmit power control for sidelink unicast, groupcast, and broadcast transmission may use different DL pathloss values.

In one embodiment, transmit power control for sidelink unicast transmission may use the same alternative, for deriving DL pathloss value for sidelink, as transmit power control for sidelink broadcast transmission. Furthermore, transmit power control for sidelink groupcast transmission may use the same alternative, for deriving DL pathloss value for sidelink, as transmit power control for sidelink broadcast transmission. In addition, transmit power control for sidelink groupcast transmission may use the same alternative, for deriving DL pathloss value for sidelink, as transmit power control for sidelink unicast transmission.

In one embodiment, transmit power control for sidelink unicast, groupcast, and broadcast transmission may use the same alternative for deriving DL pathloss value for sidelink. Furthermore, transmit power control for sidelink unicast transmission may use different alternatives, for deriving DL pathloss value for sidelink, from transmit power control for sidelink broadcast transmission. In addition, transmit power control for sidelink groupcast transmission may use different alternatives, for deriving DL pathloss value for sidelink, from transmit power control for sidelink broadcast transmission.

In one embodiment, transmit power control for sidelink groupcast transmission may use different alternatives, for deriving DL pathloss value for sidelink, from transmit power control for sidelink unicast transmission. Furthermore, transmit power control for sidelink unicast, groupcast, and broadcast transmission may use different alternatives for deriving DL pathloss value for sidelink.

In one embodiment, a (sidelink) resource pool may comprise resource(s) in a carrier or BWP. The carrier could be used for sidelink transmission and NR Uu transmission. TTI could be a slot, subframe, mini-slot, or sub-slot (in a carrier or BWP).

Figure 16:
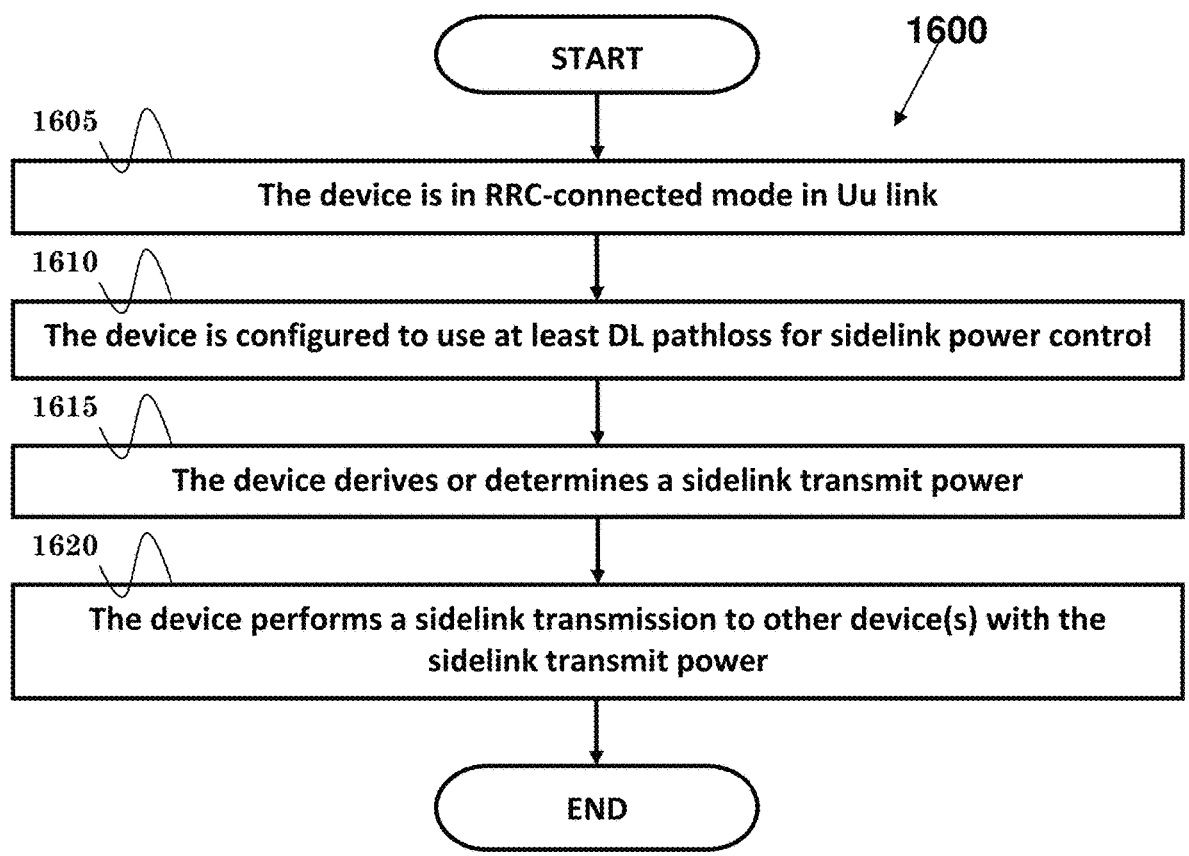
FIG. 16 a flow chart according to one exemplary embodiment.

FIG. 16 is a flow chart 1600 according to one exemplary embodiment from the perspective of a device to perform sidelink transmission. In step 1605, the device is in RRC (Radio Resource Control)-connected mode in Uu link. In step 1610, the device is configured to use at least DL (Downlink) pathloss for sidelink power control. In step 1615, the device derives or determines a sidelink transmit power. In step 1620, the device performs a sidelink transmission to other device(s) with the sidelink transmit power.

In one embodiment, the device could derive the sidelink transmit power by one of following:
  deriving a first DL pathloss value for determining an uplink transmit power of one specific kind of uplink transmission, and deriving or determining the sidelink transmit power based on the first DL pathloss value; or
  deriving one or multiple DL pathloss values based on one or multiple SS/PBCH blocks, and selecting or deriving a specific DL pathloss value based on the one or multiple DL pathloss values, and determining or deriving the sidelink transmit power based on the specific DL pathloss value.

In one embodiment, the device could derive the sidelink transmit power by (1) deriving a first DL pathloss value for determining an uplink transmit power of one specific kind of uplink transmission, and (2) deriving or determining the sidelink transmit power based on the first DL pathloss value.

Furthermore, the device could derive a second DL pathloss value for determining an uplink transmit power of an uplink transmission, wherein the uplink transmission is not the one specific kind of uplink transmission; and the device could determine or derive the sidelink transmit power without basing on or considering the second DL pathloss value. The one specific kind of uplink transmission may be PUSCH scheduled by DCI format 0_0. The DL pathloss value for determining or deriving sidelink transmit power may be associated or aligned to DL pathloss value for determining or deriving uplink transmit power of the one specific kind of uplink transmission. The DL pathloss value for determining or deriving sidelink transmit power could be derived based on DL RS (Reference Signal) used for deriving DL pathloss value for determining or deriving uplink transmit power of the one specific kind of uplink transmission.

In addition, the device could derive a power value based on the first DL pathloss value, wherein the power value is an upper bound of the sidelink transmit power.

In one embodiment, the device could derive the sidelink transmit power by (1) deriving one or multiple DL pathloss values based on one or multiple SS (Synchronization Signal) or PBCH (Physical Broadcast Channel) blocks with different indexes, (2) selecting or deriving a specific DL pathloss value based on the one or multiple pathloss values, and (3) determining or deriving the sidelink transmit power based on the specific DL pathloss value. The specific DL pathloss value could be the smallest DL pathloss value among the one or multiple pathloss values. The specific DL pathloss value could also be an average value derived from the one or multiple DL pathloss values.

The device could derive the one or multiple DL pathloss values based on the one or multiple SS or PBCH blocks that the device can obtain MIB (Master Information Block). The device could also derive each DL pathloss value respectively based on a SS or PBCH block with one SS or PBCH block index.

In addition, the device could derive a power value based on the specific DL pathloss value, wherein the power value is an upper bound of the sidelink transmit power.

Referring back to FIGS. 3 and 4, in one exemplary embodiment of a device to perform sidelink transmission. In one embodiment, the device is configured to use at least DL pathloss for sidelink power control. Furthermore, the device 300 is in RRC (Radio Resource Control)-connected mode in Uu link. In addition, the device 300 includes a program code 312 stored in the memory 310. The CPU 308 could execute program code 312 to enable the device (i) to derives or determines a sidelink transmit power, and (ii) to performs a sidelink transmission to other device(s) with the sidelink transmit power. Furthermore, the CPU 308 can execute the program code 312 to perform all of the above-described actions and steps or others described herein.

Figure 17:
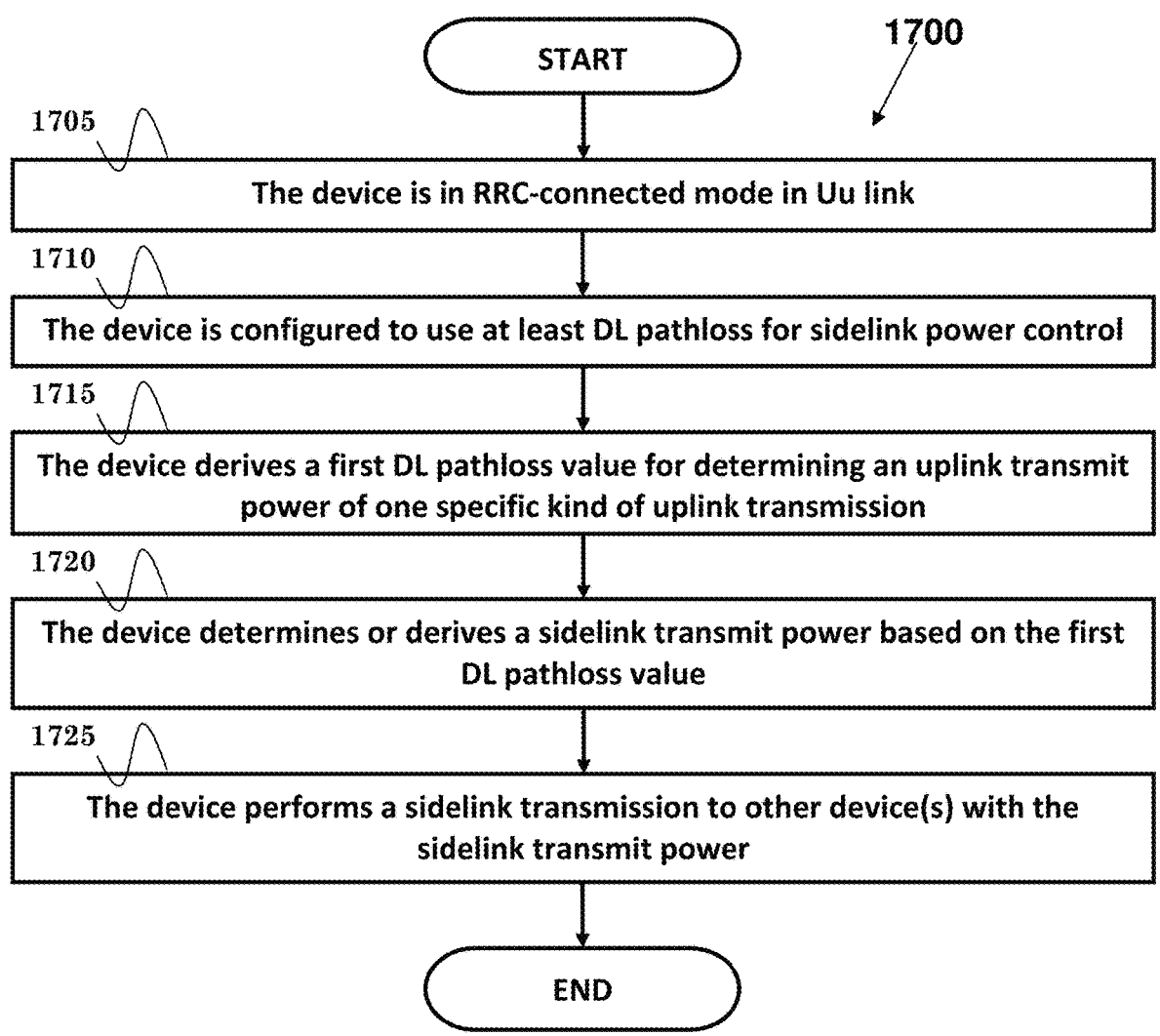
FIG. 17 is a flow chart according to one exemplary embodiment.

FIG. 17 is a flow chart 1700 according to one exemplary embodiment from the perspective of a device to perform sidelink transmission. In step 1705, the device is in RRC-connected mode in Uu link. In step 1710, the device is configured to use at least DL pathloss for sidelink power control. In step 1715, the device derives a first DL pathloss value for determining an uplink transmit power of one specific kind of uplink transmission. In step 1720, the device determines or derives a sidelink transmit power based on the first DL pathloss value. In step 1725, the device performs a sidelink transmission to other device(s) with the sidelink transmit power.

In one embodiment, the one specific kind of uplink transmission could be PUSCH scheduled by DCI format 0_0. The device could derive a second DL pathloss value for determining an uplink transmit power of an uplink transmission, wherein the uplink transmission is not the one specific kind of uplink transmission; and the device could determine or derive the sidelink transmit power without basing on or considering the second DL pathloss value.

In one embodiment, DL pathloss value for determining or deriving sidelink transmit power may be associated or aligned to DL pathloss value for determining or deriving uplink transmit power of the one specific kind of uplink transmission. DL pathloss value for determining or deriving sidelink transmit power could be derived based on DL RS used for deriving DL pathloss value for determining or deriving uplink transmit power of the one specific kind of uplink transmission.

In one embodiment, the device could derive a power value based on the first DL pathloss value, wherein the power value is an upper bound of the sidelink transmit power.

Referring back to FIGS. 3 and 4, in one exemplary embodiment of a device to perform sidelink transmission. In one embodiment, the device is in RRC-connected mode in Uu link. Furthermore, the device is configured to use at least DL pathloss for sidelink power control. In addition, the device 300 includes a program code 312 stored in the memory 310. The CPU 308 could execute program code 312 to enable the device (i) to derive a first DL pathloss value for determining an uplink transmit power of one specific kind of uplink transmission, (ii) to determine or derive a sidelink transmit power based on the first DL pathloss value, and (iii) to perform a sidelink transmission to other device(s) with the sidelink transmit power. Furthermore, the CPU 308 can execute the program code 312 to perform all of the above-described actions and steps or others described herein.

Figure 18:
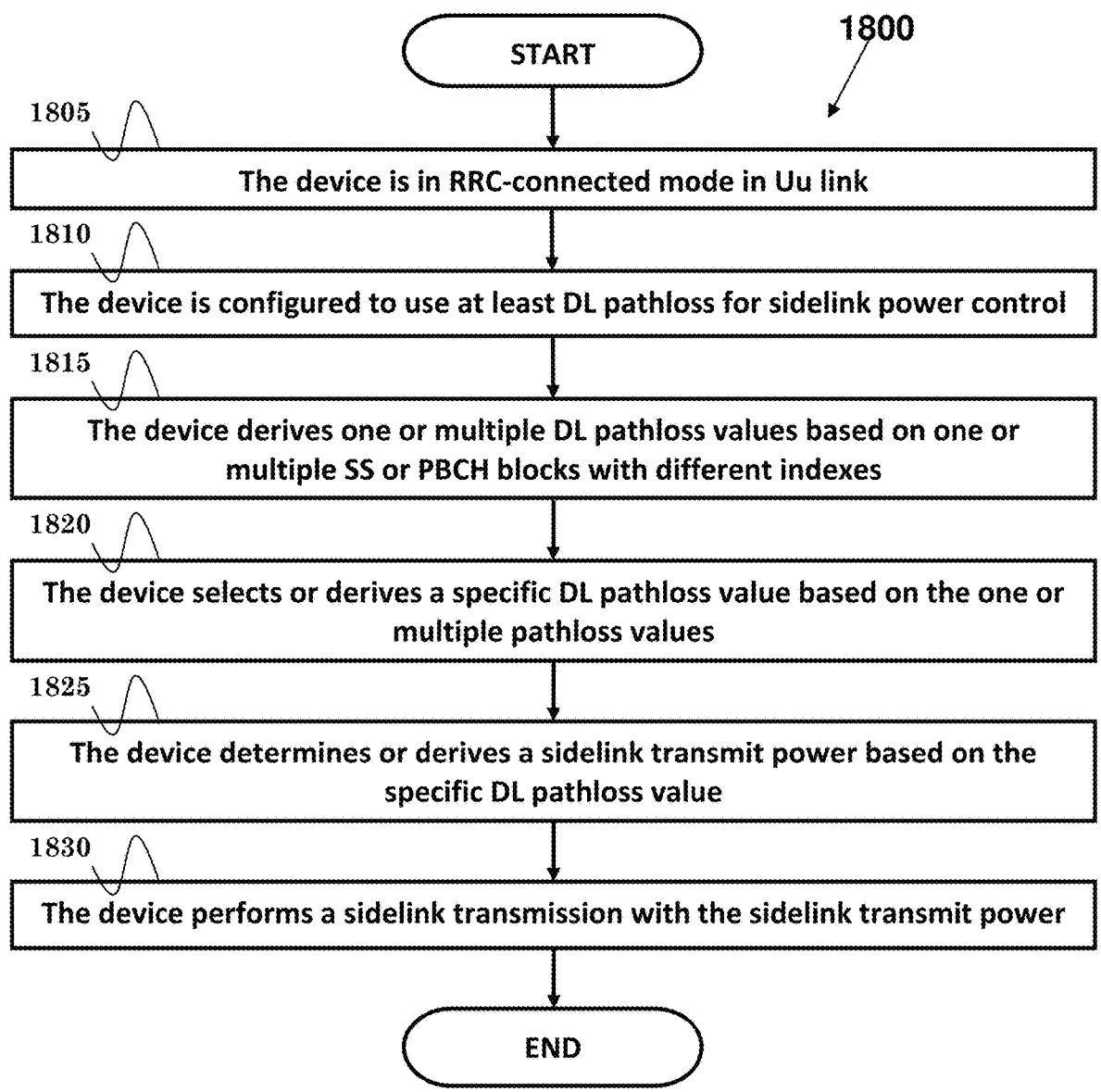
FIG. 18 is a flow chart according to one exemplary embodiment.

FIG. 18 is a flow chart 1800 according to one exemplary embodiment from the perspective of a device to perform sidelink transmission. In step 1805, the device is in RRC-connected mode in Uu link. In step 1810, the device is configured to use at least DL pathloss for sidelink power control. In step 1815, the device derives one or multiple DL pathloss values based on one or multiple SS or PBCH blocks with different indexes. In step 1820, the device selects or derives a specific DL pathloss value based on the one or multiple pathloss values. In step 1820, the device determines or derives a sidelink transmit power based on the specific DL pathloss value. In step 1825, the device performs a sidelink transmission with the sidelink transmit power.

In one embodiment, the specific DL pathloss value could be the smallest DL pathloss value among the one or multiple pathloss values, or the specific DL pathloss value could be an average value derived from the one or multiple DL pathloss values.

In one embodiment, the device could derive the one or multiple DL pathloss values based on one or multiple SS or PBCH blocks that the device can obtain MIB. The device could derive each DL pathloss value respectively based on SS or PBCH block with one SS or PBCH block index.

In one embodiment, the device could derive a power value based on the specific DL pathloss value, wherein the power value is an upper bound of the sidelink transmit power.

Referring back to FIGS. 3 and 4, in one exemplary embodiment of a device to perform sidelink transmission. In one embodiment, the device is in RRC-connected mode in Uu link. Furthermore, the device is in RRC-connected mode in Uu link. In addition, the device 300 includes a program code 312 stored in the memory 310. The CPU 308 could execute program code 312 to enable the device (i) to derives one or multiple DL pathloss values based on one or multiple SS or PBCH blocks with different indexes, (ii) to select or derive a specific DL pathloss value based on the one or multiple pathloss values, (iii) to determine or derive a sidelink transmit power based on the specific DL pathloss value, and (iv) to perform a sidelink transmission with the sidelink transmit power. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a device to perform sidelink transmission, comprising:
   the device is in RRC (Radio Resource Control)-connected mode in Uu link;
   the device is configured to use at least DL (Downlink) pathloss for sidelink power control;
   the device derives a first DL pathloss value for determining an uplink transmit power of one specific kind of uplink data transmission scheduled by DCI (Downlink Control Information) format 0_0;
   the device determines or derives a sidelink transmit power based on the first DL pathloss value; and
   the device performs a sidelink transmission to other device(s) with the sidelink transmit power.

2. The method of claim 1, wherein the device derives a second DL pathloss value for determining an uplink transmit power of an uplink data transmission, wherein the uplink data transmission is not the one specific kind of uplink data transmission; and
   the device determines or derives the sidelink transmit power without basing on or considering the second DL pathloss value.

3. The method of claim 1, wherein DL pathloss value for determining or deriving sidelink transmit power is associated or aligned to DL pathloss value for determining or deriving uplink transmit power of the one specific kind of uplink data transmission.

4. The method of claim 1, wherein DL pathloss value for determining or deriving sidelink transmit power is derived based on DL RS (Reference Signal) used for deriving DL pathloss value for determining or deriving uplink transmit power of the one specific kind of uplink data transmission.

5. The method of claim 1, wherein the device derives a power value based on the first DL pathloss value, wherein the power value is an upper bound of the sidelink transmit power.

6. The method of claim 1, wherein the first DL pathloss value for deriving or determining the sidelink transmit power is not associated with or not aligned to DL pathloss value for determining uplink transmit power of a non-specific kind of uplink data transmission that is different than the one specific kind of uplink data transmission.

7. The method of claim 6, wherein the non-specific kind of uplink data transmission comprises PUSCH (Physical Uplink Shared Channel) scheduled by DCI (Downlink Control Information) format 0_1.

8. A method of a device to perform sidelink transmission, comprising:
   the device is in RRC (Radio Resource Control)-connected mode in Uu link;
   the device is configured to use at least DL (Downlink) pathloss for sidelink power control;
   the device derives one or multiple DL pathloss values based on one or multiple SS (Synchronization Signal) or PBCH (Physical Broadcast Channel) blocks with different indexes;
   the device selects or derives a specific DL pathloss value based on the one or multiple DL pathloss values;
   the device determines or derives a sidelink transmit power based on the specific DL pathloss value; and
   the device performs a sidelink transmission with the sidelink transmit power.

9. The method of claim 8, wherein the specific DL pathloss value is the smallest DL pathloss value among the one or multiple DL pathloss values, or
   the specific DL pathloss value is an average value derived from the one or multiple DL pathloss values.

10. The method of claim 8, wherein the device derives the one or multiple DL pathloss values based on one or multiple SS or PBCH blocks that the device obtains MIB (Master Information Block).

11. The method of claim 8, wherein the device derives each DL pathloss value respectively based on SS or PBCH block with one SS or PBCH block index.

12. The method of claim 8, wherein the device derives a power value based on the specific DL pathloss value, wherein the power value is an upper bound of the sidelink transmit power.

13. The method of claim 1, wherein the device does not use DL pathloss value for determining uplink transmit power of a non-specific kind of uplink data transmission, comprising PUSCH scheduled by DCI format 0_1, to derive the sidelink transmit power.

* * * * *